(12) United States Patent
Swank et al.

(10) Patent No.: US 10,332,412 B2
(45) Date of Patent: *Jun. 25, 2019

(54) METHOD AND APPARATUS FOR ADAPTIVE LEARNING

(71) Applicants: Eugene David Swank, Temecula, CA (US); David Joseph Dowling, Malibu, CA (US)

(72) Inventors: Eugene David Swank, Temecula, CA (US); David Joseph Dowling, Malibu, CA (US)

(*) Notice: Subject to any disclaimer, the term of this patent is extended or adjusted under 35 U.S.C. 154(b) by 50 days.

This patent is subject to a terminal disclaimer.

(21) Appl. No.: 15/382,447

(22) Filed: Dec. 16, 2016

(65) Prior Publication Data

US 2017/0178531 A1 Jun. 22, 2017

Related U.S. Application Data

(63) Continuation-in-part of application No. 15/089,351, filed on Apr. 1, 2016, now Pat. No. 10,043,410.

(Continued)

(51) Int. Cl.

| G09B 5/06 | (2006.01) |
|---|---|
| G09B 7/06 | (2006.01) |
| G09B 7/08 | (2006.01) |
| A63F 13/80 | (2014.01) |
| G06F 21/31 | (2013.01) |
| G09B 19/02 | (2006.01) |

(52) U.S. Cl.
CPC .............. *G09B 7/08* (2013.01); *A63F 13/80* (2014.09); *G06F 21/31* (2013.01); *G09B 5/065* (2013.01); *G09B 7/06* (2013.01); *G09B 19/025* (2013.01); *G06F 2221/2137* (2013.01); *G06F 2221/2149* (2013.01)

(58) Field of Classification Search
CPC .......... G09B 7/06; G09B 7/08; G09B 19/025; G09B 5/065; G06F 21/31; G06F 2221/2149; A63F 13/70–13/80
See application file for complete search history.

(56) References Cited

U.S. PATENT DOCUMENTS

| 5,286,036 A | * | 2/1994 | Barabash | ............... A63F 9/183 273/429 |
|---|---|---|---|---|
| 5,716,273 A | * | 2/1998 | Yuen | ...................... A63F 13/10 348/E5.099 |

(Continued)

OTHER PUBLICATIONS

Bjork, R. A., & Bjork, E. L. (1992). A new theory of disuse and an old theory of stimulus fluctuation. From learning processes to cognitive processes: Essays in honor of William K. Estes, 2, 35-67.

(Continued)

*Primary Examiner* — Milap Shah
(74) *Attorney, Agent, or Firm* — Seyfarth Shaw LLP; Puya Partow-Navid

(57) ABSTRACT

A method of providing a task is presented. The method includes receiving, from a task administrator, multiple subjects to be presented in the task and presenting the task in response to a condition being satisfied. The method also include adaptively adjusting a difficulty level of a subject of the plurality of subjects based on a spacing interval, a speed of completing the task, and/or performance of a previous subject level.

20 Claims, 21 Drawing Sheets

Related U.S. Application Data

(60) Provisional application No. 62/269,400, filed on Dec. 18, 2015.

(56) References Cited

U.S. PATENT DOCUMENTS

| | | | | |
|---|---|---|---|---|
| 6,551,104 | B2* | 4/2003 | Becker | G09B 19/02 434/201 |
| 7,632,101 | B2* | 12/2009 | Braunberger | G09B 7/00 434/322 |
| 8,548,443 | B2* | 10/2013 | Anson | H04W 4/021 455/410 |
| 8,955,058 | B2* | 2/2015 | Castro | H04L 63/08 726/17 |
| 8,997,240 | B1* | 3/2015 | Kohen | G06F 21/31 713/182 |
| 9,037,864 | B1* | 5/2015 | Staddon | G06F 21/32 713/182 |
| 9,131,374 | B1* | 9/2015 | Avni | H04W 12/06 |
| 10,043,410 | B1* | 8/2018 | Swank | G09B 7/08 |
| 2009/0165033 | A1* | 6/2009 | Clancy | H04N 7/173 725/25 |
| 2010/0047755 | A1* | 2/2010 | Mills | G09B 7/00 434/322 |
| 2010/0263055 | A1* | 10/2010 | Habif | H04L 9/32 726/27 |
| 2011/0004934 | A1* | 1/2011 | Beylerian | G06F 21/62 726/21 |
| 2011/0018682 | A1* | 1/2011 | Weisfeld | A63B 24/0059 340/5.7 |
| 2011/0281643 | A1* | 11/2011 | Rioux | G07C 9/00126 463/29 |
| 2012/0158468 | A1* | 6/2012 | Wheeler | G06Q 30/0207 705/14.1 |
| 2012/0214442 | A1* | 8/2012 | Crawford | H04W 12/06 455/411 |
| 2013/0111408 | A1* | 5/2013 | Berus | G06F 17/30873 715/835 |
| 2014/0072949 | A1* | 3/2014 | Smend | G06Q 10/1097 434/362 |
| 2014/0137219 | A1* | 5/2014 | Castro | H04L 67/02 726/6 |
| 2014/0272894 | A1* | 9/2014 | Grimes | G09B 5/08 434/350 |
| 2014/0278895 | A1* | 9/2014 | Grimes | G06Q 30/0231 705/14.31 |
| 2014/0280944 | A1* | 9/2014 | Montgomery | H04L 67/10 709/225 |
| 2015/0007307 | A1* | 1/2015 | Grimes | G09B 5/08 726/18 |

OTHER PUBLICATIONS

Carpenter, S. K., Cepeda, N. J., Rohrer, D., Kang, S. H., & Pashler, H. (2012). Using spacing to enhance diverse forms of learning: Review of recent research and implications for instruction. Educational Psychology Review, 24(3), 369-378.

Karpicke, J. D., & Blunt, J. R. (2011). Retrieval practice produces more learning than elaborative studying with concept mapping. Science, 331(6018), 772-775.

Kornell, N., Hays, M. J., & Bjork, R. A. (2009). Unsuccessful retrieval attempts enhance subsequent learning. Journal of Experimental Psychology: Learning, Memory, and Cognition, 35(4), 989.

Little, J. L., Bjork, E. L., Bjork, R. A., & Angello, G. (2012). Multiple-choice tests exonerated, at least of some charges fostering test-induced learning and avoiding test-induced forgetting. Psychological Science, 23(11), 1337-1344.

Roediger, H. L., & Karpicke, J. D. (2006). The power of testing memory: Basic research and implications for educational practice. Perspectives on Psychological Science, 1(3), 181-210.

Rowland, C. A. (2014). The effect of testing versus restudy on retention: A meta-analytic review of the testing effect. Psychological Bulletin, 140(6), 1432.

Storm, B. C., Bjork, R. A., & Storm, J. C. (2010). Optimizing retrieval as a learning event: When and why expanding retrieval practice enhances long-term retention. Memory & Cognition, 38(2), 244-253.

Taylor, K., & Rohrer, D. (2010). The effects of interleaved practice. Applied Cognitive Psychology, 24(6), 837-848.

Yan, V. X., Garcia, M. A., Bjork, E L., & Bjork, R. A. (Nov. 2013). Learning Better, Learning More: The Benefits of Expanding Retrieval Practice. 54th Annual Scientific Meeting of the Psychonomic Society, Toronto, Ontario. Nov. 14-17.

Kapur, M. (2010). Productive failure in mathematical problem solving. Instructional Science, 38(6), 523-550.

Yan, V. X. (May 10, 2016). Guest Post: Retrieval Strength Versus Storage Strength. [Blog post]. Retrieved from http://www.learningscientists.org/blog/2016/5/10-1.

Pennebaker, J. W. & Gosling, S. D. (2015). Rethinking online education: Melding the best of teaching, television, and testing. Symposium talk presented at the 27th convention of the Association for Psychological Science, New York City, NY, May 21-24.

* cited by examiner

FIG. 5A

METHOD AND APPARATUS FOR ADAPTIVE LEARNING

CROSS-REFERENCE TO RELATED APPLICATION

The present application claims the benefit of U.S. Provisional patent application Ser. No. 15/089,351, filed on Apr. 1, 2016 and titled "METHOD AND APPARATUS FOR ADAPTIVE LEARNING," and U.S. Provisional Patent Application No. 62/269,400, filed on Dec. 18, 2015 and titled "CAPTIVE PORTAL QUIZZES FOR LEARNING ON MOBILE DEVICE," the disclosures of which are expressly incorporated by reference herein in their entirety.

BACKGROUND

Field

Certain aspects of the present disclosure generally relate to adaptive learning on a mobile device and in particular, adaptive learning for access control of a mobile device based on test, such as a quiz, results.

Background

As the user base for mobile devices grows, it is desirable for parents, guardians, teachers and/or other individuals/corporations/government entities to provide access control for different components of a mobile device. Access control may be referred to as screen time access control. For example, a parent may desire to limit access to the entire device and/or limit access to specific applications. Conventional access control techniques may specify a passcode and/or set a timer for access. Still, while conventional access control techniques may prevent access to a device and/or an application, the conventional access control techniques are neither captive nor educational. That is, conventional access control techniques do not provide an engaging and/or adaptive learning environment to the user. Furthermore, in conventional access control techniques, the user may bypass the access control method in a variety of ways, such as learning the passcode or hitting the home button on the mobile device.

Therefore, it is desirable to provide a captive access control method that is educational and adaptive to the user's performance. That is, it is desirable to provide a captive access control method that provides learning based upon scientific learning-related research, knowledge, and experience. Aspects of the present disclosure are directed to adaptive learning of tasks, such as a test, provided on a device, such as a mobile device. In the present application, a test may also be referred to as a quiz. Furthermore, aspects of the present disclosure are directed to providing adaptive learning for access control to the mobile device and/or applications on a mobile device.

SUMMARY

In one aspect of the present disclosure, a method of wireless communication is disclosed. The method includes receiving, from a user or task administrator, multiple subjects to be presented in the task. The method also includes presenting the task in response to a condition being satisfied. The method further includes adaptively adjusting a difficulty level of a subject of the plurality of subjects based on a spacing interval, a speed of completing the task, and/or performance of a previous subject level.

Another aspect of the present disclosure is directed to an apparatus including means for receiving, from a user or task administrator, multiple subjects to be presented in the task. The apparatus also includes means for presenting the task in response to a condition being satisfied. The apparatus further includes means for adaptively adjusting a difficulty level of a subject of the plurality of subjects based on a spacing interval, a speed of completing the task, and/or performance of a previous subject level.

In another aspect of the present disclosure, a non-transitory computer-readable medium with non-transitory program code recorded thereon is disclosed. The program code for providing a task is executed by a processor and includes program code to receive, from a user or task administrator, multiple subjects to be presented in the task. The program code also includes program code to present the task in response to a condition being satisfied. The program code further includes program code to adaptively adjust a difficulty level of a subject of the plurality of subjects based on a spacing interval, a speed of completing the task, and/or performance of a previous subject level.

Another aspect of the present disclosure is directed to an apparatus for providing a task having a memory unit and one or more processors coupled to the memory unit. The processor(s) is configured to receive, from a user or task administrator, multiple subjects to be presented in the task. The processor(s) is also configured to present the task in response to a condition being satisfied. The processor(s) is further configured to adaptively adjust a difficulty level of a subject of the plurality of subjects based on a spacing interval, a speed of completing the task, and/or performance of a previous subject level.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 5A, 5B, 5C, and 5D illustrate examples of cloud-based learning dashboard screens according to aspects of the present disclosure.

DETAILED DESCRIPTION

Figure 1:
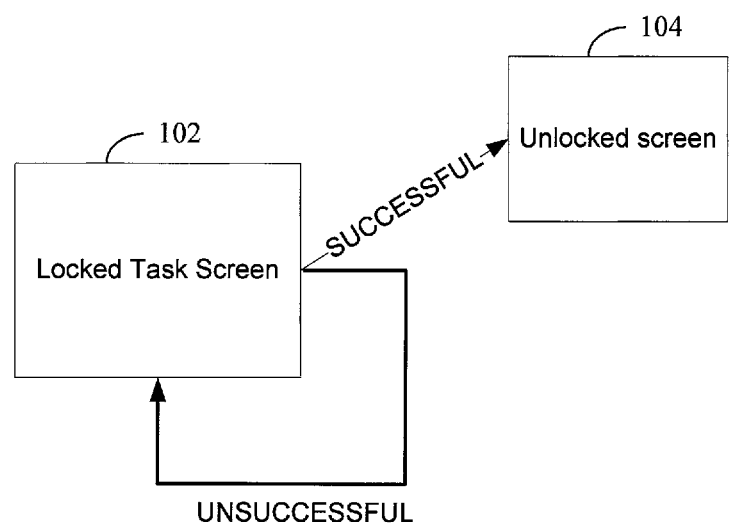
FIG. 1 is a diagram illustrating an example process of adaptive learning on a mobile device according to one aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In cognitive psychology, two conventional learning strategies are retrieval practice (e.g., testing effect) and spacing (e.g., distributed practice). Researchers have attempted to employ these principles to schools and teachers. Still, conventional learning techniques do not use these principals. It is desirable to provide an application that provides an individual with an active learning environment. Aspects of the present disclosure provide a platform to tailor learning for specific individuals and thus improve an individual's learning.

Research has demonstrated that answering a quiz question and retrieving that information from memory improves learning. Quizzing has been shown to be improve learning across many different types of learning, such as vocabulary learning, math learning, conceptual learning, and complex learning. Quizzing has also been shown to improve learning across all types of learners (e.g., across all ages/education levels).

Not only has research shown direct benefits of quizzing (from the act of retrieving information from memory), but research has also demonstrated that quizzing can also have indirect benefits. For example, quizzing may improve a student's ability to learn from instruction and feedback. That is, research shows that quizzing leads to learning gains, even when a learner answers incorrectly. The very attempt to answer, and hence activate relevant background knowledge, will help a student learn more from subsequent feedback, compared to if the student was simply shown the correct answer. Leveraging this research, aspects of the present disclosure provide quiz questions and hints to scaffold learning when a concept is unfamiliar or difficult.

In one configuration, multiple-choice quizzes are used for learning. Although multiple choice quizzes are often considered to be less difficult than open-ended tests, research suggests that multiple choice tests may improve learning, as long as the multiple choice options are well-constructed.

The sequencing of quiz questions may also improve learning. For learning to occur, concepts should be repeated and provided at intervals (e.g., spaced out). Spacing a concept over time benefits learning because the interval provides the time for the learner to "forget" the concept. In allowing the user to forget (e.g., fade the concept from the forefront of the mind), the retrieval processes is engaged such that greater attention may be paid to the concept the next time the concept is presented. Alternatively, when different questions relating to the same concept are crammed together, the user may be given a false sense of fluency and an "illusion of learning" without triggering the underlying processes that lead to long-term learning. By delivering brief bursts of quizzes (e.g., users are given just a handful of questions each time), aspects of the present disclosure use spacing to improve learning.

Furthermore, when a user has learned a first concept better than a second concept, the user should wait a greater time to return to the first concept. In one configuration, sequencing principles are used to determine the time for delivering content to a user based on the level of mastery. That is, questions on a given concept have a minimum delay and the interval between re-presenting the concept increases as a user's mastery level increases. Incorrect responses, on the other hand, reduce the interval between subsequent presentations. In this way, aspects of the present disclosure flexibly space out concepts as tailored for specific concepts and for individual learners.

Additionally, rather than repeatedly re-presenting the same questions, aspects of the present disclosure are directed to repeating a concept in a spaced manner. For example, a concept may be "subtraction of two-digit numbers, with borrowing." In this example, at a first instance, the user may see "82−38=?" and at the next instance the user may see "25−19=?" In this example, the content of the questions (e.g., numbers) change while the underlying principle remains the same. Thus, the concept may be reinforced rather than a user memorizing a specific answer. Aspects of the present also interleave (e.g., intermix) different concepts. That is, rather than focusing on one concept at a time, aspects of the present disclosure interleave different concepts to improve learning.

In one configuration, item-response concepts directed to retrieval strength versus storage strength are used to estimate a student's mastery ability. That is, the ability to answer a question correctly several times may not provide sufficient evidence that the student fully mastered a concept. Rather, if a student has answered questions on the same concept correctly numerous times over an extended time period, the evidence suggests that the student has mastered a concept to a certain extent.

The aforementioned learning principles may be applied to all learners across a wide range of disciplines. Aspects of the present disclosure are not limited to students of a particular age or education level. Regardless of age or education level, students may believe that passive studying is easier than active testing. By implementing the active testing of the aforementioned principals with a device-lock, aspects of the present disclosure leverage a student's (e.g., user's) desire to use their device (e.g., mobile device) to achieve the desired learning goals.

Additionally, aspects of the present disclosure improving a users' knowledge of how to learn, thereby improving the user's ability to apply the tools of how to learn to other parts of their lives. By delivering messaging in hints and in summary reports to a supervisor (e.g., parent), awareness of learning science research is improved.

FIG. 1 is a diagram illustrating an example process of adaptive learning on a mobile device according to one aspect of the present disclosure. As shown in FIG. 1, a user of the mobile device is presented with a locked task screen 102 upon interaction with the mobile device. For example, when the mobile device is idle or in a sleep-mode, touching or activating the mobile device may trigger the presentation of a locked task screen 102. In one configuration, the locked task screen is preceded by an animated splash screen (not shown). In one configuration, the locked task screen 102 may replace a factory set lock screen, may be presented before or after a factory set lock screen is presented, and/or may replace the default application launcher. Access to the device is permitted when the device is unlocked and access to the device is limited when the device is in the locked state. For example, the user may only make emergency calls, turn off the device, check learning progress, engage the sketch pad, utilize the voice reader/recognition function and/or answer quiz questions when the device is in the locked state. A user may also receive calls when the device is in the locked state, however, the device returns to a locked state upon completion of the call. Additionally, a user may bypass the locked state by selecting a password option and entering a password or pin established by a task administrator, such as a parent, teacher, guardian, and/or other third party individuals/corporations/government entities.

According to an aspect of the present disclosure, the user is specified to successfully perform a task provided on the task screen 102 to gain access to the mobile device. As an example, the task may be a multiple choice quiz, an interactive audio dialogue session, an interactive video session, an interactive game, an interactive or static advertising session and/or an interactive written session. In one configuration, access to the mobile device is granted when the number of correct answers for a test is equal to or greater than a correct answer threshold. That is, when the user has successfully finished the task as prescribed, the user is presented with an unlocked screen 104. The applications and/or features on the mobile device may be accessible to the user via the unlocked screen 104. The mobile device may be unlocked for an unlimited time or a set time period after the successfully finishing the task.

Alternatively, if the user fails to successfully complete the task, the device remains in the locked state (e.g., locked task screen 102). The task may be unsuccessfully completed if the number of correct answers is less than a threshold and/or if the task was not completed within a prescribed time period. The user may be presented with the locked task screen 102 after failing to successfully complete the task and the user may re-attempt to complete the task when the user interacts with the device. When re-attempting to perform the task, the user is again presented with a task on locked task screen 102.

The locked task screen 102 may also be specified to unlock the locked task screen via a password supplied by task administrator. Furthermore, the locked task screen 102 may also provide the ability to dial 911 or reach "emergency" contacts provided by a user or task administrator. Furthermore, the locked task screen 102 may provide the ability to select the device user, engage the sketch pad, utilize voice reader/recognition functionality, turn audio on or off; and to view progress reports within the locked task screen environment In one configuration, when a correct answer is input on the locked task screen, an interstitial or correct answer screen (FIG. 4C) is displayed with a text message, icon, and/or graphic to indicate the correct answer. The correct answer may also be displayed on the interstitial or correct answer screen. Furthermore, when an incorrect answer is input on the locked task screen, an interstitial or incorrect answer screen (FIG. 4D) may display a text message, icon, and/or graphic indicating the incorrect answer, providing a hint option, and/or including a try again button. In one configuration, an incorrectly answered question is presented again in response to the user selecting the try again button. The hint option may provide additional information to help the user answer the same question, immediately or in the future, and/or a similar type of question in the future.

Figure 5A:
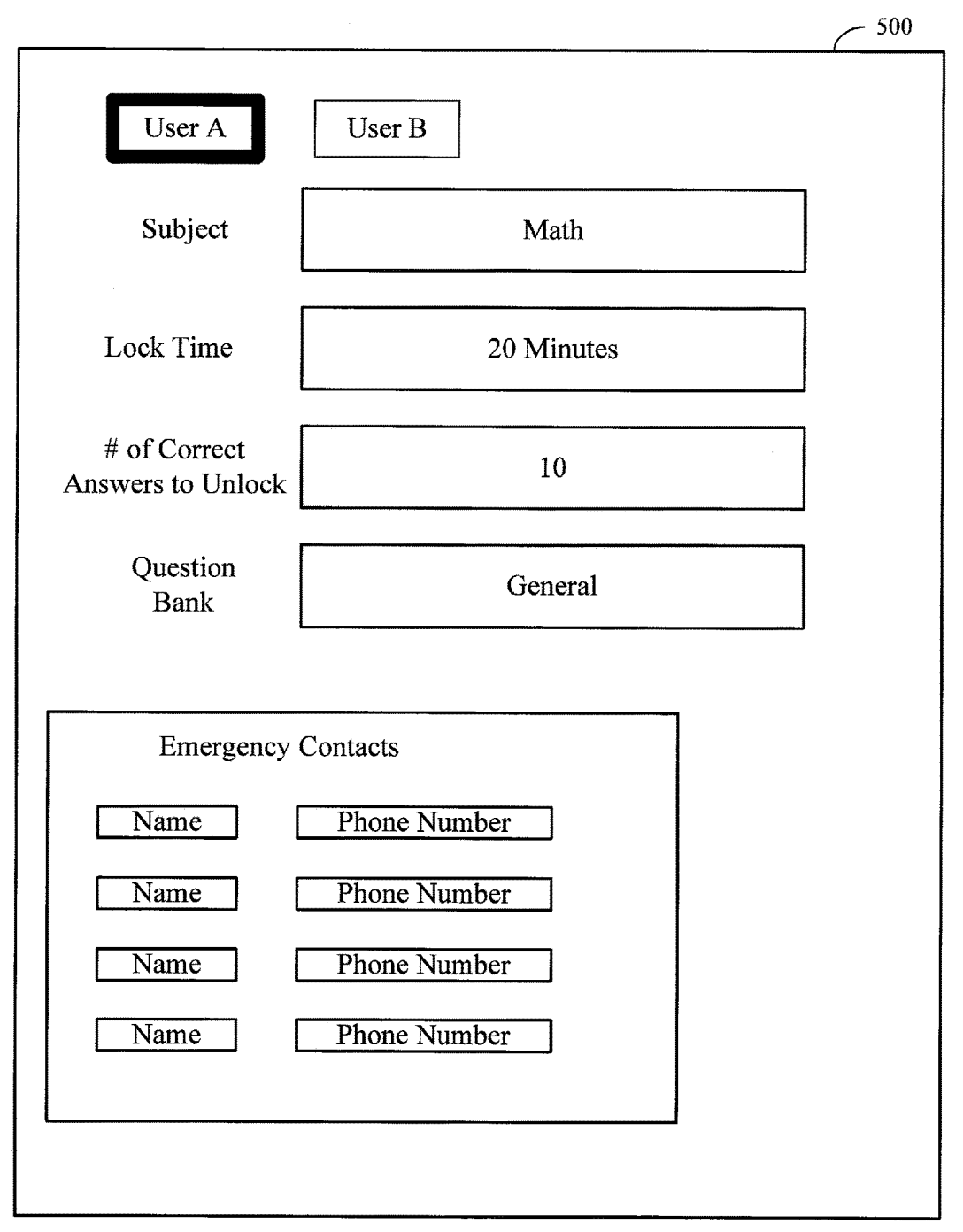
Figure 5B:
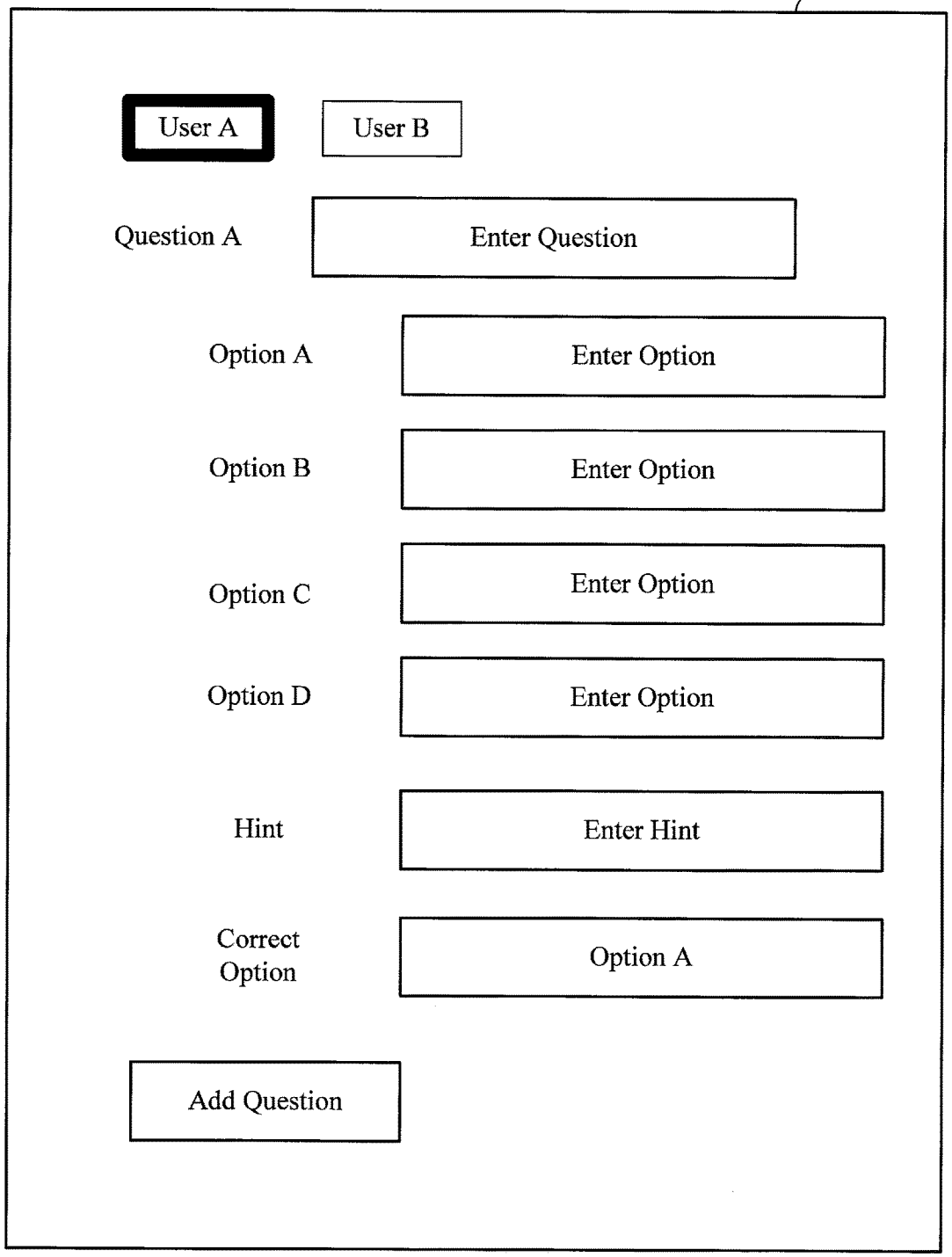
Figure 5C:
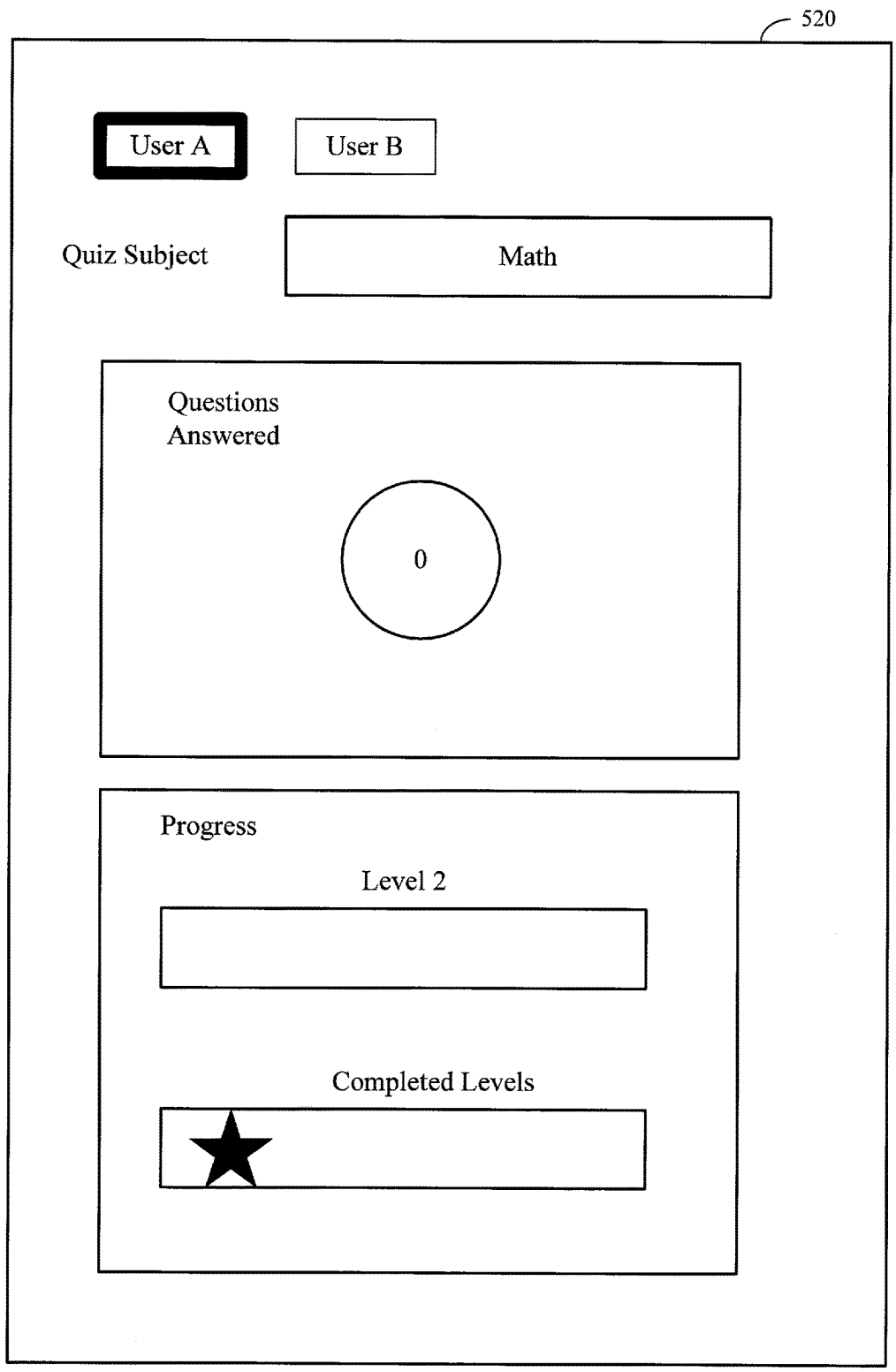
Figure 5D:
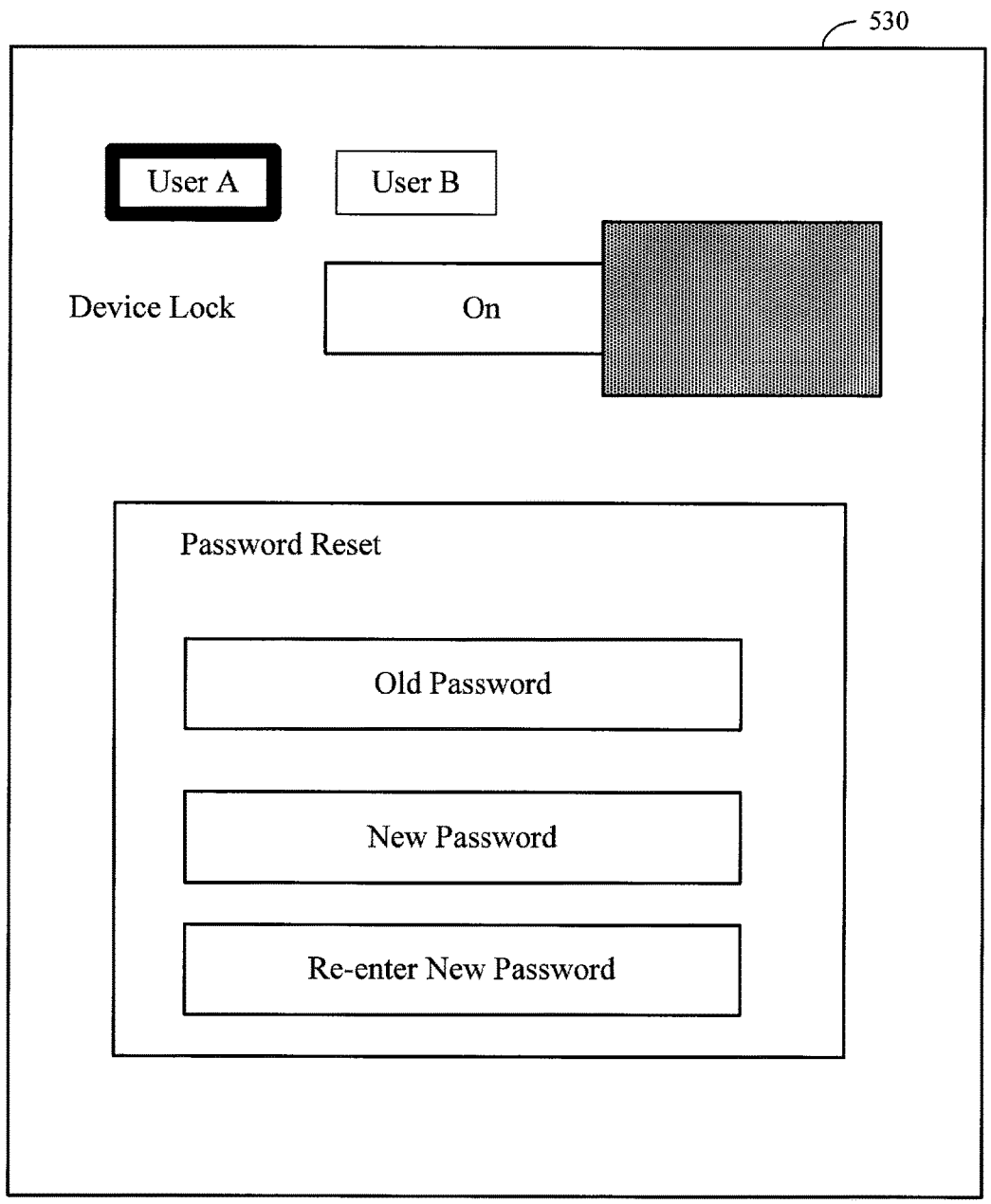

The number of task re-attempts (e.g., re-attempt threshold) may be defined by a task administrator, such as a parent, teacher, guardian, or individual/corporation/government entity, or may be a default setting. If the number of re-attempts exceeds the re-attempt threshold, the system may prevent the user from re-taking a test for a predetermined time period. The task administrator may be a third party, such as a parent, guardian, or teacher. The task administrator may remotely access the device and may remotely configure the task settings (FIG. 5A). For example, the task administrator can remotely access the device to update emergency contact phone numbers included on the locked task screen 102. In addition, the task administrator can remotely access the device to update the frequency with which the locked task screen 102 appears, as well as the number of correct answers required to unlock the device. In another example, the task administrator may remotely access the device to remotely unlock or remove the task screen from the device for a period of time (FIG. 5D).

The task administrator may also remotely adjust the locked task screen 102 settings, such as, learning category or subject matter, the number of questions to answer correctly before a device unlock, the frequency of tests or quizzes, the maximum number of quiz questions per day, and time between tasks. The task administrator may also add users for each device and/or add contact phone numbers (FIG. 5A). The task administrator may also create and upload custom quiz questions and/or content to be included in the tasks (FIG. 5B).

It should be noted that FIG. 1 presents a high-level interaction session between the user and the mobile device. Aspects of the present disclosure are not limited to the steps shown in FIG. 1 as alternative steps or additional steps are also contemplated. Furthermore, aspects of the present disclosure are directed to adaptive learning for tasks. That is, tasks may increase or decrease in difficulty based on the user's performance. The tasks are not limited to unlocking a mobile device and may be specified for other purposes, such as homework or entertainment. Furthermore, the task may be referred to as a test or quiz. Still, aspects of the present disclosure are not intended to limit the task to a test or quiz. Of course, other types of tasks are contemplated.

In one aspect of the present disclosure, the adaptive learning application is installed on a mobile device. The adaptive learning application may include a captive portal lock screen (e.g., locked task screen) that regulates access to the mobile device. In one configuration, the locked task screen may replace a factory set lock screen, it may be presented before or after a factory set lock screen is presented and/or it may replace the default application launcher. The captive portal lock screen may replace the default lock screen of a mobile device, or may be initiated (e.g., displayed) when attempting to unlock the mobile device via the default lock screen, or may appear immediately before, after, or over the default lock screen. The captive portal lock screen may provide a task, such as a quiz, for gaining access to the mobile device. After correctly performing the task, the user may have restricted or unrestricted access to the mobile device for a configurable amount of time. It should be noted that the user is provided access to emergency services via their mobile device at any time in the event of an emergency. The user's (e.g., child's) interaction with the application or interface may vary based on their skill level and/or subject matter. That is, the application and/or interface may be personalized based on the user's answers and/or interaction.

The adaptive learning application may include a graphical interface for a captive portal (e.g., walled garden), whereby the user interacts with the graphical interface to obtain access to the mobile device. As previously discussed, the adaptive learning process may gamify the learning process while allowing a task administrator to control the level of mobile device access (e.g., screen time) and the time spent learning on the mobile device. The task administrator can monitor progress and modify the functionality of the device remotely, such as via a cloud based interface or a dashboard The cloud based interface may be a Web (e.g., Internet) based interface (as shown in FIGS. 5A-5D).

The adaptive learning application may also restrict a user's access on a device to a "walled garden" of content or applications. In one configuration, content or applications included in the "walled garden" may be determined by a task administrator, third party, or by a default setting.

User information, such as name, grade, and/or age may be input by the task administrator during the sign-up process. This information may be used to develop and show a category or subject specific diagnostic test during a user's first interaction with the lock screen. For example, there may be a math diagnostic test for $1^{st}$ graders and a different math diagnostic test for $4^{th}$ graders. After completion of this diagnostic test, the application determines the correct level of question difficulty to apply to each user.

In one example, a user is presented with a series of multiple choice questions. A task administrator may configure testing options, such as frequency, difficulty, and/or subject matter for the multiple choice questions. The configuration of testing options may be performed on the device that presents the questions and/or via a separate device. The testing options may be stored on a networking cloud. In one configuration, the quiz is adaptable such that the quiz's content and difficulty level are set to the interest and/or skill level of the user. The task may be adjusted at the mobile device and/or may be adjusted at the cloud and downloaded to the mobile device.

In the present example, upon correctly answering the questions, the user is granted access to the mobile device. In one configuration, the granted access is set for a predetermined time period, such that the user does not have an unlimited time period for access. The predetermined time period may be set by a task administrator or may be a default setting. Furthermore, the user may obtain either full or partial access to use the mobile device for a specified time duration. Partial access refers to the user having access to specific applications on a device. As an example of partial access, the user may have access to a web browser and may not have access to text messaging. As another example, the user may have access only to a predetermined type and number of applications determined by the task administrator, third party, or default setting.

After the predetermined time period has expired, the user may be redirected to a graphical interface to answer a new set of test questions and/or to perform a new task, such as reading a passage from a story, to obtain subsequent access to the mobile device. The unlock and lock process may repeat in a continuous loop. In one configuration, the number of locks and unlocks may be limited. For example, the user may be allowed to lock and unlock the device ten times a day. One purpose of this learning process is for the user to be educated before gaining access to their mobile device. This process may also be used to assess the aptitude of the user.

In another example, a user may interact with the interface of the mobile device by reading a story displayed on the mobile device's screen. The adaptive learning application may use voice recognition to determine whether the child is properly reading the short story. Furthermore, the adaptive learning application may assist with mispronounced and/or unrecognized words or phrases. In this example, the adaptive learning application may assess the user's reading aptitude and provide reading practice before granting access to the mobile devices.

When the reading condition is satisfied, the user may obtain full or partial access to the mobile device for a predetermined time period. As previously discussed, the predetermined time period may be set by a task administrator or may be a default setting. Additionally, after the predetermined time period has expired, the user may be redirected to a graphical interface to read another story and/or perform a new task, such as answering questions, for obtaining subsequent access to the mobile device.

In another example, the task may be an interactive video session. For the interactive video session the user may need to answer questions related to a displayed video. In yet another example, the task may be an interactive written session. For the interactive written session the user may be presented with a prompt and the user may need to write an essay in response to the prompt. As another example, for the interactive written session, the user may write-in relevant information for a specified category. For example, the user may be prompted to input their blood pressure reading.

In another example, the task may be interacting with, or viewing an advertisement. The individual advertisement may vary in length and the number of advertisements to be viewed and the frequency of viewing may be set by the task administrator or by default.

In one configuration, access to the device is also remotely granted by the parent or task administrator via a dashboard, such as a Learning Dashboard. For example, the task administrator may grant access to the device when the user completes their homework, performs chores, and/or performs a noteworthy achievement. In this example, the task administrator may add tokens, such as unlock tokens, to the network cloud via a device or application, such as a web portal. The token allows the user to obtain access to the mobile device for an unlimited or predetermined time period. The task administrator may also set and control predetermined periods of device access for the user. For example, the task administrator may block access to the device for a set period of time (e.g., 7-8 PM on weekdays, overnight hours, and/or during the weekend).

The cloud based dashboard also allows task administrators to remotely input settings for the locked task screen on the mobile device, as well as review a progress "Report Card" and make edits to their account information. The progress "Report Card" may be customized by the task administrator by categories, such as user, device, learning category or subject matter and/or time period. Progress reports are then generated including time spent, number of tasks, task progress, and examples of correct and incorrect answers to task questions. In addition, the Report Card includes a comments or talking points section for the task administrator providing feedback, hints and encouragement (based on progress) they can share with the user(s) (FIG. 5C).

Additionally, in one configuration, the task screen interface may include graphics, such as a photo, and may audibly ask questions regarding the graphic. For example, the graphic may be a picture of a fruit bowl and the question may ask to identify a number of oranges in the fruit bowl. The user may verbally answer the questions and the voice recognition system may interpret the answer. Questions may also be answered in writing. Upon correctly answering the questions the user may be granted temporary access to the mobile device.

Figure 2:
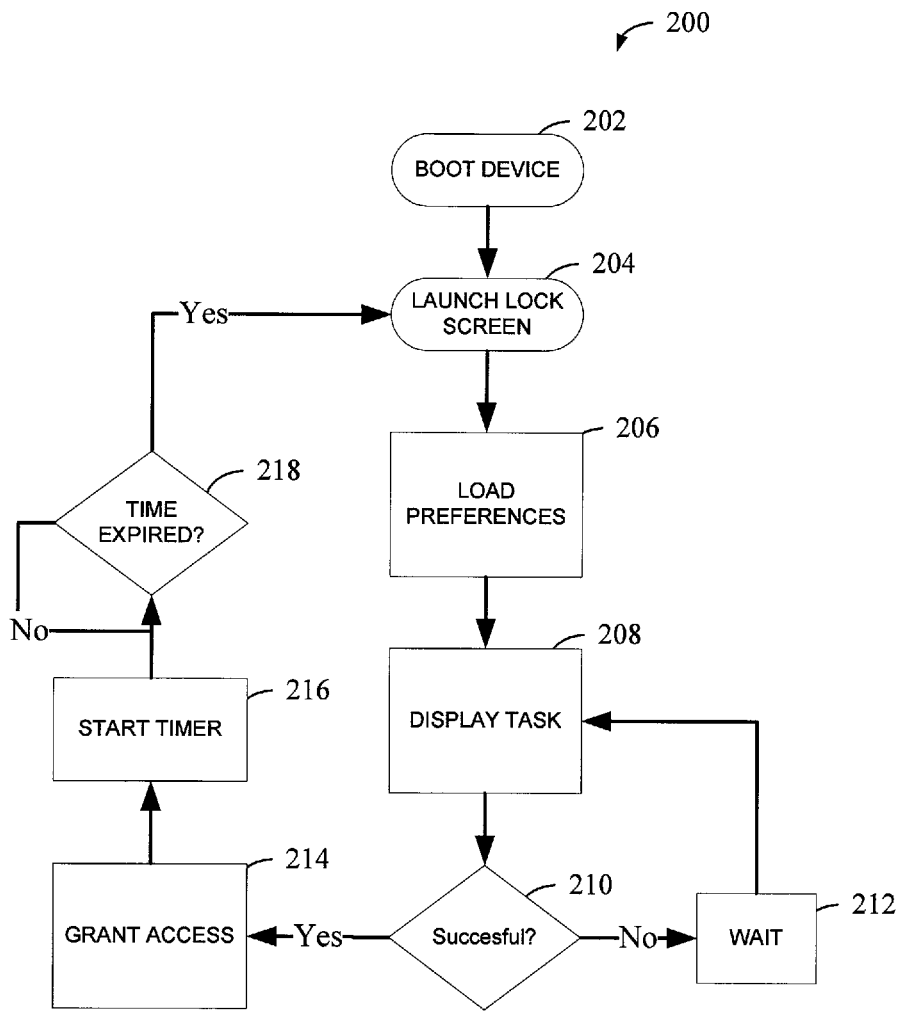
FIG. 2 is a flowchart illustrating an example process of adaptive learning on a mobile device according to one aspect of the present disclosure

FIG. 2 is a flowchart 200 illustrating an example of adaptive learning according to one aspect of the present disclosure. As shown in FIG. 2, at block 202, the mobile device boots up. A proprietary adaptive learning application may be loaded with the initial boot process. At block 204, upon booting the device, the adaptive learning application launches a locked screen on the mobile device. In one configuration, either simultaneous to or subsequent to launching the lock screen, the adaptive learning application loads various preferences and default settings from a database on the cloud (block 206). The preferences and default settings may be used to initialize a test to be presented to a user. Additionally or alternatively, some or all of the preferences and default settings may be saved in a local memory of the mobile device. Upon an attempt to use the mobile device, the adaptive learning application displays a task to be performed (block 208). The task may be a quiz or other task, such as reading a story. The task and/or task preferences may be initialized with the loaded preferences.

As previously discussed, the user must successfully perform the task to obtain access to the mobile device. At block 210, the adaptive learning application determines if the task was successfully completed. The task may be successfully completed if a number of correct answers is greater than or equal to an answer threshold and/or if the task was performed before the expiration of a timer. In another example, the task is successfully completed if a number of correct words of a read story are greater than or equal to a word threshold and if the story was completed before the expiration of a timer. In another example, the task is successfully completed if an advertisement is viewed and/or interacted with. Of course, other criteria may also be used to determine whether the task was successfully completed.

In one configuration, if the user fails to complete the task, the adaptive learning application waits a predefined amount of time, at block 212, before displaying the task again (block 208). In one configuration, at block 212, the adaptive learning application may adaptively adjust the difficulty level of the test based on a variety of factors, including but not limited to, the difficulty level of the current test, the user's personal preferences, and/or a cumulative test performance score based on the past test results. For example, after failing a predetermined number of tasks, the difficulty of the task may be decreased. Additionally, or alternatively, the difficulty of a specific subject matter may be adjusted while the difficulty of other subject matter remains the same. After adjustment of the difficulty level, the adaptive learning application may display a new task at block 208.

When the user successfully completes the task, at block 210, the adaptive learning application grants access to the mobile device, at block 214. In one configuration, after granting the access, the adaptive learning application may start a timer, at block 216, to allow the access for a predetermined time period. The adaptive learning application may check whether the timer has expired at block 218. If the timer has expired, the adaptive learning application displays the lock screen (block 204). Otherwise, the adaptive learning continues to grant access while continuing to determine whether the time has expired (block 218).

The flowchart diagram for adaptive learning on the mobile device as illustrated in FIG. 2 and described above is one example process of adaptive learning. Alternative and/or additional processes for adaptive learning on the mobile device are contemplated.

Figure 3:
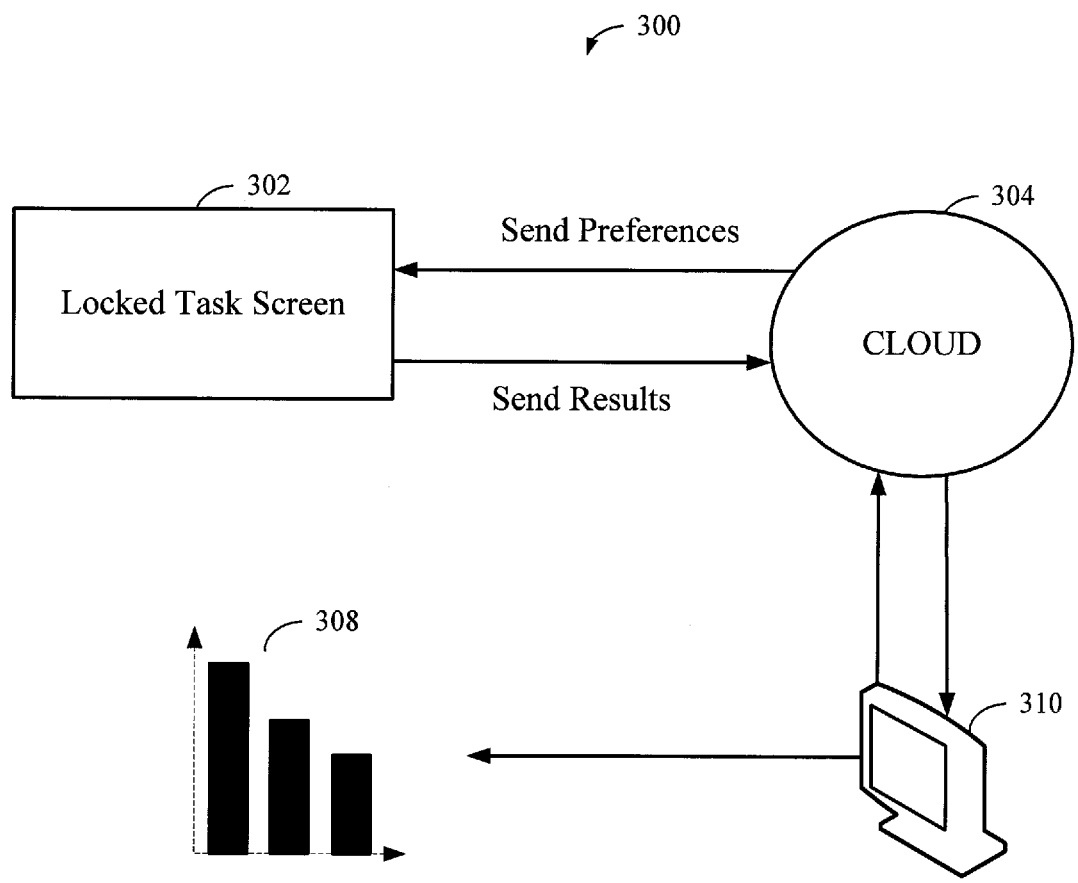
FIG. 3 is a diagram illustrating an example cloud based adaptive learning model according to one aspect of the present disclosure.

FIG. 3 is a diagram illustrating an example cloud based adaptive learning model 300 according to one aspect of the present disclosure. As shown in FIG. 3, an adaptive learning model 300 includes a task based lock screen 302, a network cloud 304, a web-based adaptive learning interface/application 310 for managing preferences and/or learning parameters, and a reporting interface 308. Of course, aspects of the present disclosure may also work in an offline mode. Furthermore, the adaptive learning interface/application 310 may be any device with a web-based (e.g., Internet based) interface.

In one configuration, the network cloud 304 provides storage and networking capabilities to connected applications and users. For example, the network cloud 304 may send the test preferences and learning parameters to the task based lock screen 302 for presenting a task to the user. The task based lock screen 302 may send the task results and other user data to the network cloud 304 for storage. In another example, when the user attempts to wake up the device from a sleeping event and/or after the unlock duration has expired, the adaptive learning application may retrieve and synchronize the local device preferences with the preferences stored in the cloud.

In one configuration, different preferences may be saved for multiple users associated with a device. For example, a device may be used by siblings of different ages. Thus, a task that is applicable to the older sibling may not be applicable to the younger sibling. Therefore, it may be desirable to store different user preferences for one device. A user-based task may be initialized by identifying a specific user at the lock screen or task screen. Additionally, or alternatively, preferences for a user may be saved across multiple devices. That is, multiple devices may support a single account.

Additionally, the network cloud 304 may also interact with the web-based adaptive learning interface/application 310 to allow a user or task administrator to manage test preferences and/or learning parameters. The web-based adaptive learning interface/application 310 may also interact with the reporting interface 308 to provide reports and/or alerts related to the user's cumulative learning sessions (e.g., tasks) or a specific task. The web-based interface/application 310 can be a portal that is used to remotely monitor the quiz results, input quiz questions, and/or to set preferences for the device and adaptive learning application.

Figure 4A:
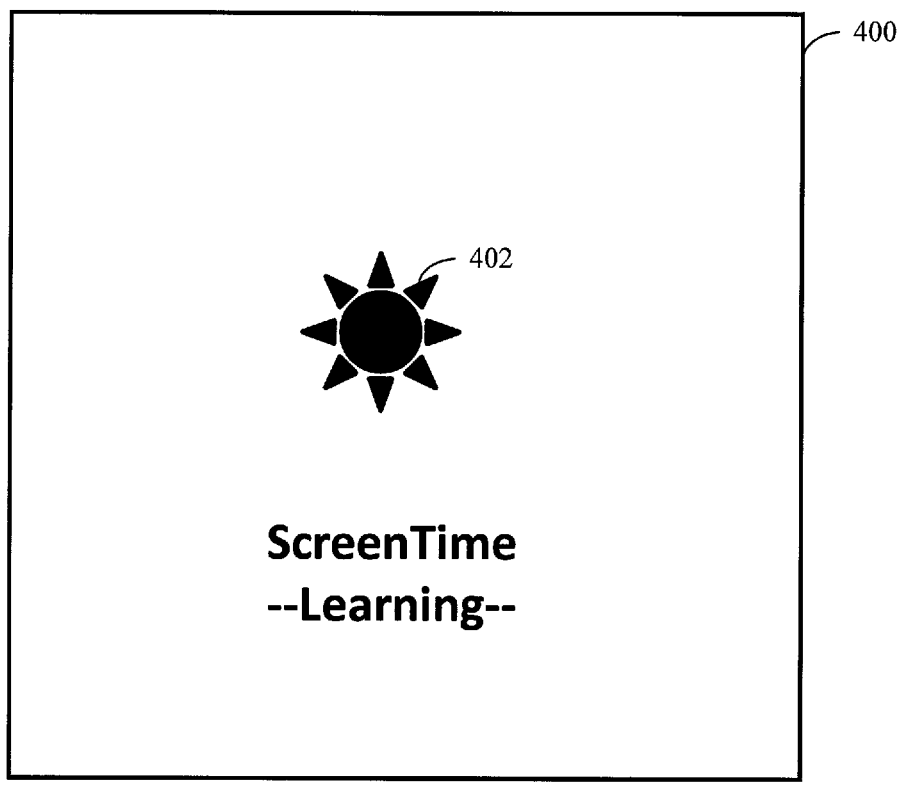
FIGS. 4A, 4B, 4C, 4D, 4E, 4F, 4G, 4H, and 4I illustrate examples of test screens according to aspects of the present disclosure.
Figure 4B:
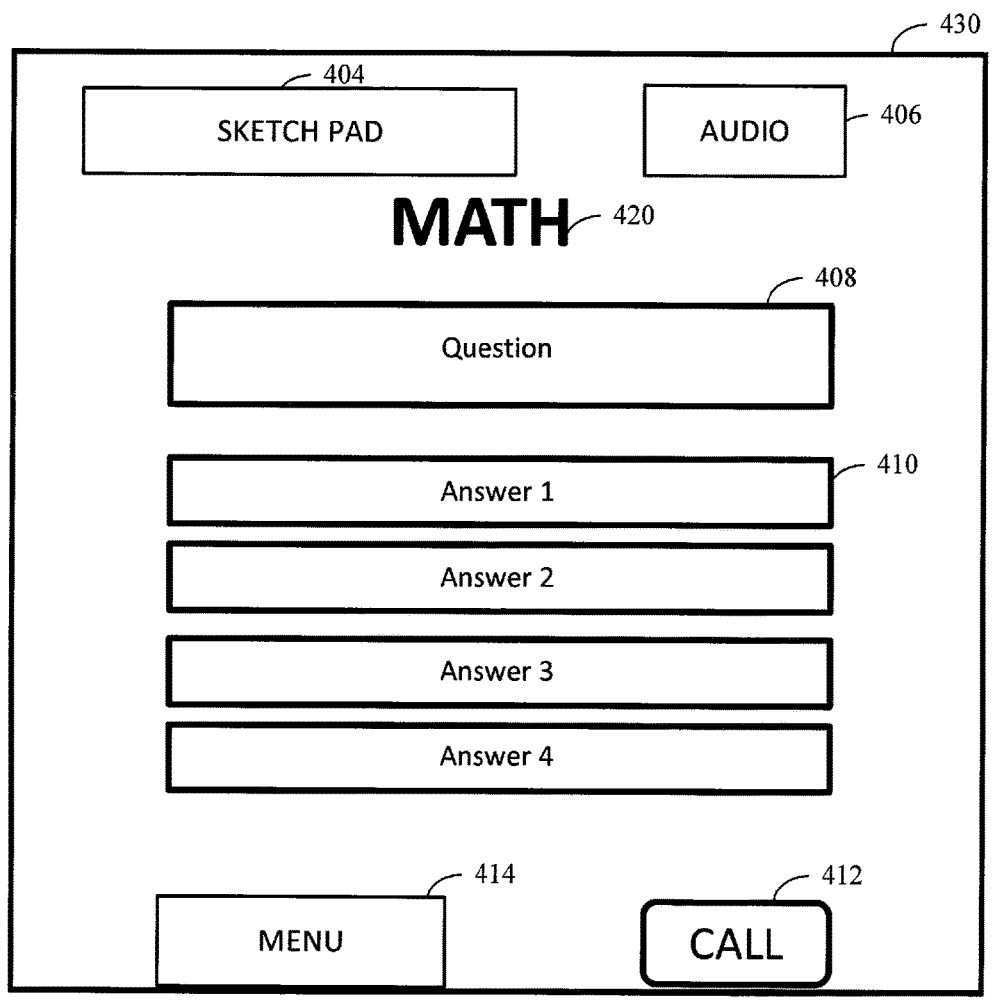

FIG. 4A illustrates an example of a boot screen 400 according to one aspect of the present disclosure. The boot screen 400 may include an animation 402. Furthermore, the boot screen 400 may be shown prior to the locked task screen. FIG. 4B illustrates an example of a locked task screen 430 according to an aspect of the present disclosure. As shown in FIG. 4B, the locked task screen 430 includes a sketch pad button 404, an audio on/off button 406, a subject indicator 420, a question 408 related to the subject, and multiple answers 410. The locked task screen 430 may also include a menu button 414 for displaying user names, quiz bypass, progress illustrations and a call button 412 for making emergency calls.

In one configuration, one or more users may be registered for a device. Thus, in the example of FIG. 4F, the menu button contains a "user" category that allows for the identification of the active user as well as the ability to switch users on the device by selecting any other named users. Furthermore, the "Bypass Quiz" feature may be used to unlock the device. In one configuration, when attempting to unlock the device via the lock button (FIG. 4E), the user is prompted for a password and the device is unlocked when the correct password is input. Furthermore, the locked state may be set as default. As shown in FIG. 4B, the task is a answering a math question. Of course, the task is not limited to math questions and other tasks may be presented. For example, the task screen may provide quiz questions in multimedia formats, including, but not limited to: text, texture, graphics, audio, and video.

Figure 4C:
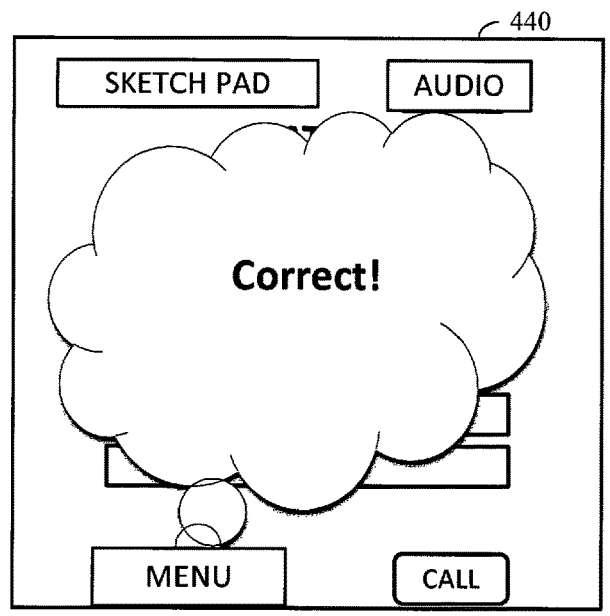
Figure 4D:
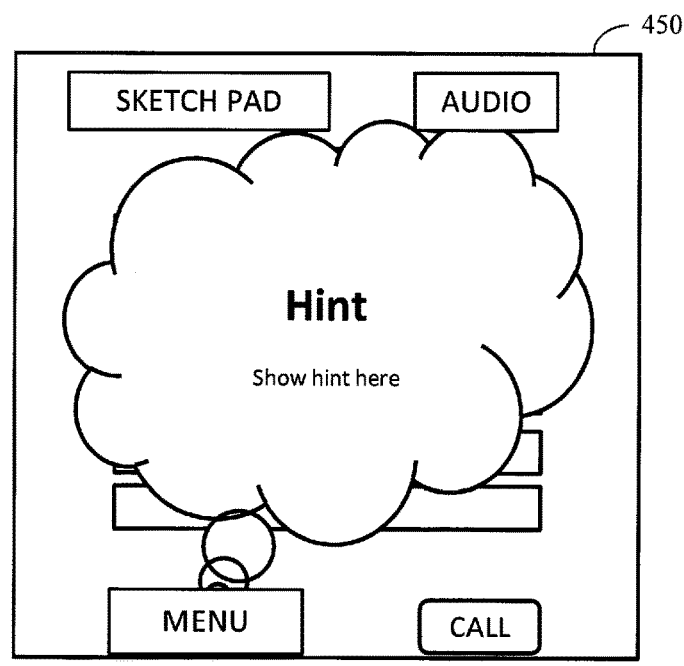

In FIG. 4B, the subject indicator 420 indicates the subject (e.g., math) and presents a question 408 related to the subject. Furthermore, the question 408 may be a multiple-choice question, thus, one or more answers 410 may be presented. In this example, the user is prompted to select the correct answer from the presented answers 410. As shown in FIG. 4C, the user may be presented with a correct answer screen 440 when the user selects the correct answer from the presented answers 410. This correct answer screen may include the correct answer restated. As shown in FIG. 4D, in another example, the user may be presented with a hint screen 450 when the user selects the incorrect answer from the presented answers 410. This hint screen may include a try again button. Additionally, or alternatively, the user may receive or request a hint on the screen or from a hint button (not shown).

Figure 4E:
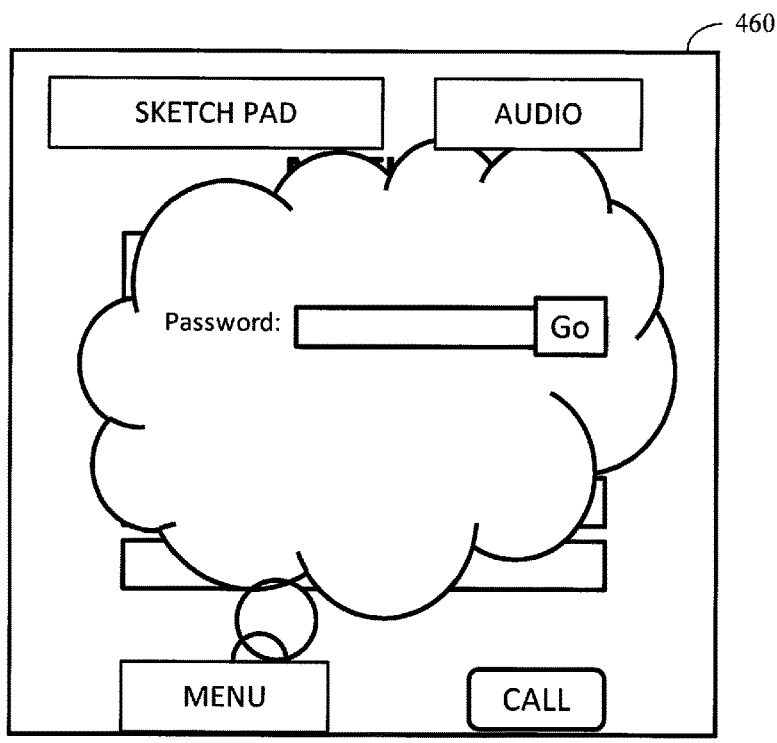
Figure 4F:
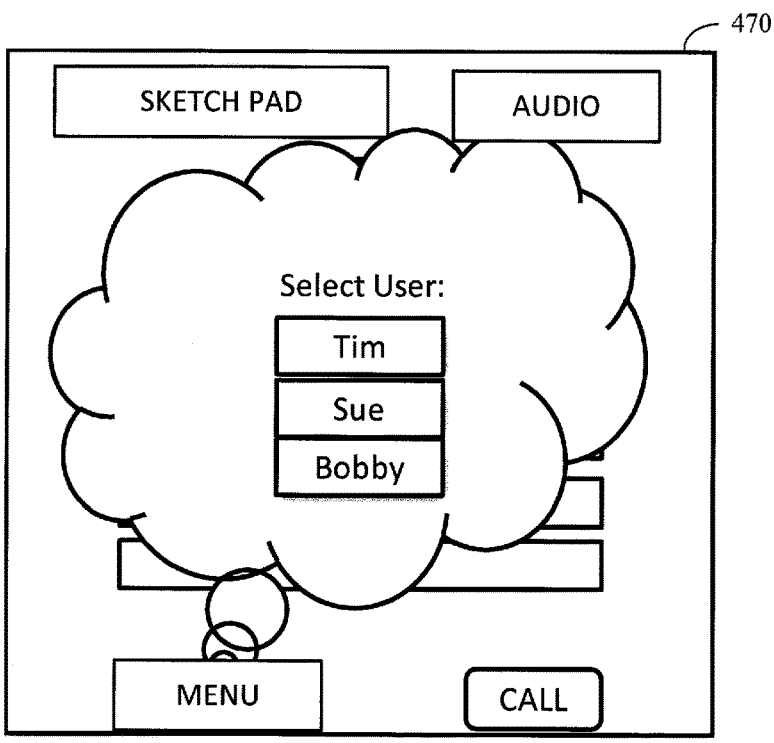

FIG. 4E illustrates an example of a password input screen 460. As previously discussed, the password input screen 460 may be displayed when attempting to unlock the phone via the menu button 414. FIG. 4F illustrates an example of a user selection screen 470. As previously discussed, one or more users may be configured for a device. Accordingly, one of the users may be selected via the user selection screen 470.

Figure 4G:
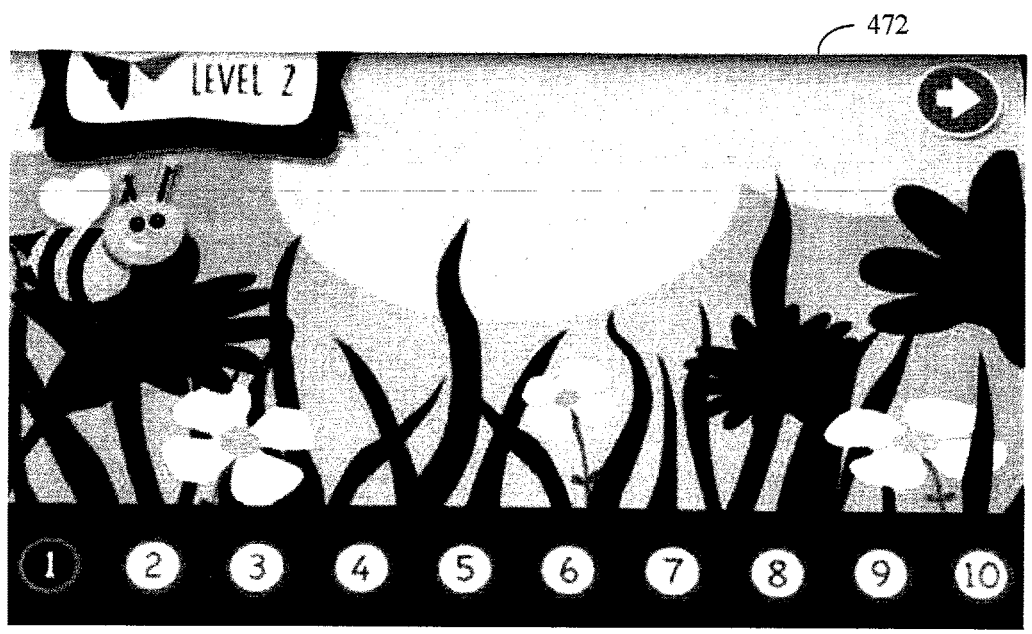

FIG. 4G illustrates an example of a progress screen 472 according to aspects of the present disclosure. The progress screen may be accessed from the menu button 414. As the user progresses throughout a subject, the progress is updated to reflect their current level. The progress may be in the form of an illustration.

Figure 4H:
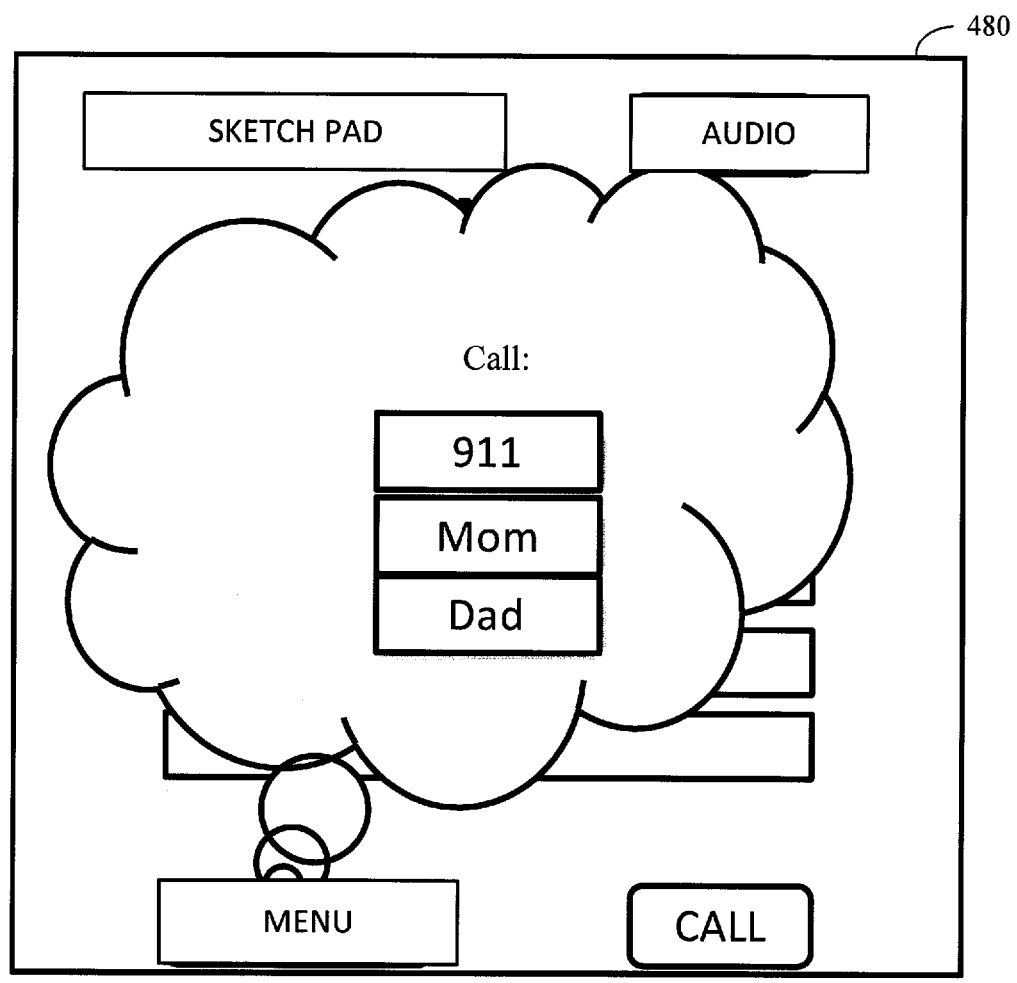

FIG. 4H illustrates an example of an emergency number screen 480. As previously discussed, the user may make an emergency call via the call button 412. As shown in. FIG. 4H, the emergency call numbers may include, but are not limited to, 911 and/or the user's parents/guardian.

Figure 4I:
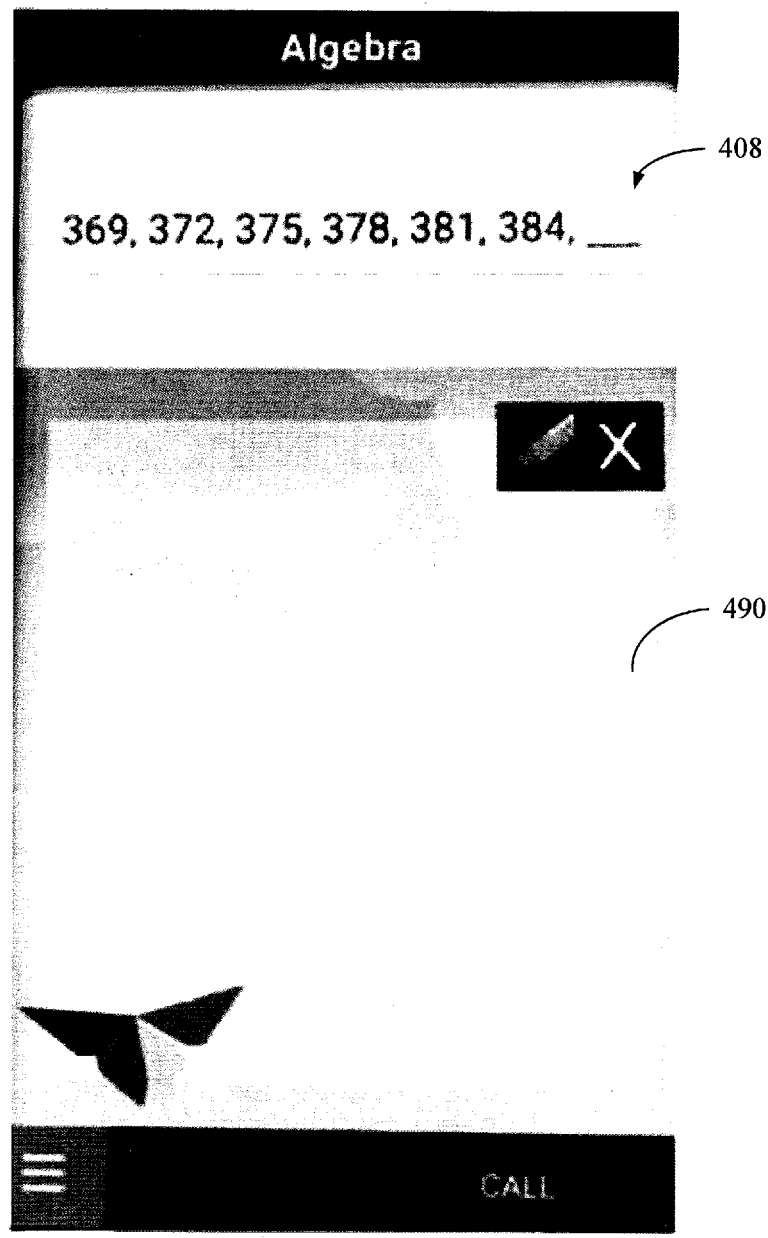

FIG. 4I illustrates an example of a sketch pad 490 according to aspects of the present disclosure. In one configuration, the sketch pad is accessed from the sketch pad button (not shown in FIG. 4I). The user can write on the sketch pad with their finger to help in solving test or quiz questions. The user may also erase content on the sketch pad and start over again. Furthermore, the sketch pad can be opened or closed while the question 408 is visible on the screen.

Various forms of interactive dialogues between the user and the task screen may be available. For example, in one example, a captive portal, or a quiz based session may be provided to the user. In another example, the user may choose an intelligent dictation task where the user reads content and the adaptive learning application determines if the user is reading properly.

In one configuration, the task screen of an adaptive learning application may be monitored and configured remotely by a task administrator. The task administrator may be presented with one or more options to control access to the mobile device. These options may include, but are not limited to: subject matter, number of questions to answer before the device is unlocked, and/or duration of each unlock period. In one example aspect, the task administrator may initiate a full lock out, which can be viewed as essentially grounding the child from their mobile device. In another example, the task administrator may initiate a full or partial lock out of the device based upon time parameters. For example, the child's device could be locked every evening at 9 PM and unlocked at 8 AM the following day.

As illustrated in FIG. 3, the adaptive learning application may use cloud components to track quiz performance and to provide detailed reporting on topics including, but not limited to: quiz duration, number of questions answered, correct answers, incorrect answers, duration between answering questions, progress level, levels completed and/or strengths and weaknesses.

Furthermore, based on the monitoring, the task administrator may remotely lock and/or unlock the task screen. Additionally, the task administrator may be able to remotely adjust difficulty level of a test subject, various predetermined thresholds, and/or durations. For example, the task administrator may adjust the unlock duration. Additionally, the task administrator may also turn on or off system-wide settings such as automatic saving of task results and a task state, and/or enabling/disabling access to emergency call capability. In one configuration, the capability of turning on/off system setting allows for testing the adaptive learning application during an application test period.

Furthermore, the adaptive learning application may remotely enable or disable alerts and/or reports of task related information, on a per task basis or on a per user basis. In one configuration, the task administrator sets up triggers and/or alarms that will alert the task administrator via short message service (SMS), simple network management protocol (SNMP) trap, and/or email when certain thresholds are reached. The thresholds may include, for example, a predefined level of achievement, a predefined level of performance or progress, etc. The triggers and/or alarms may also be set to be sent at a desired schedule.

In one configuration, the adaptive learning application allows the task administrator to remotely send, change, and/or cancel rewards to the user. In one example, a task administrator may load allowance money into an account of the user with the adaptive learning system that can be used as a reward for reaching certain achievement levels. The allowance can be earned based on criteria defined by the task administrator. The reward criteria may be stored in a cloud database and may be remotely updated and controlled by the task administrator. For example, after earning an allowance, the child can redeem the allowance for gift cards at various online and brick and mortar retailers such as Amazon, Walmart, etc.

FIG. 5A illustrates an example of a task administrator screen 500 according to an aspect of the present disclosure. As shown in FIG. 5A, a task administrator may set a testing subject, set a lock time, set a number of correct answers to unlock the device, and select a question bank (e.g., source for questions). Of course, aspects of the present disclosure are not limited to the settings of FIG. 5A as other settings are also contemplated. Also, as shown in FIG. 5A, the task administrator screen 500 may allow the task administrator to set emergency contacts. The settings may be set per user or may be global settings.

FIG. 5B illustrates an example of a custom quiz screen 510 according to an aspect of the present disclosure. As shown in FIG. 5B, a task administrator may provide a custom question as well as custom answers (e.g., options). The custom quiz screen 510 may also allow the task administrator to provide a hint and specify the correct answer. The custom question may be set per user or may be a global question (e.g., for all users).

FIG. 5C illustrates an example of a user status screen 520 (e.g., progress report screen) according to an aspect of the present disclosure. As shown in FIG. 5C, a task administrator may check the status of a user, such as number of questions answered for a subject, current progress in a level, and number of levels completed. Of course, aspects of the present disclosure are not limited to the statuses provided in FIG. 5C as other statuses are also contemplated.

FIG. 5D illustrates an example of a remote lock screen 530 according to an aspect of the present disclosure. As shown in FIG. 5D, a task administrator may remotely lock/unlock a user device and/or reset a password. Of course, aspects of the present disclosure are not limited to the options provided in FIG. 5D as other statuses are also contemplated. For example, the remote lock screen 530 may also allow the task administrator to enable/disable the lock screen or the quizzes (not shown in FIG. 5D). Enabling/disabling the lock screen or quizzes may be a universal lock/unlock.

Figure 6:
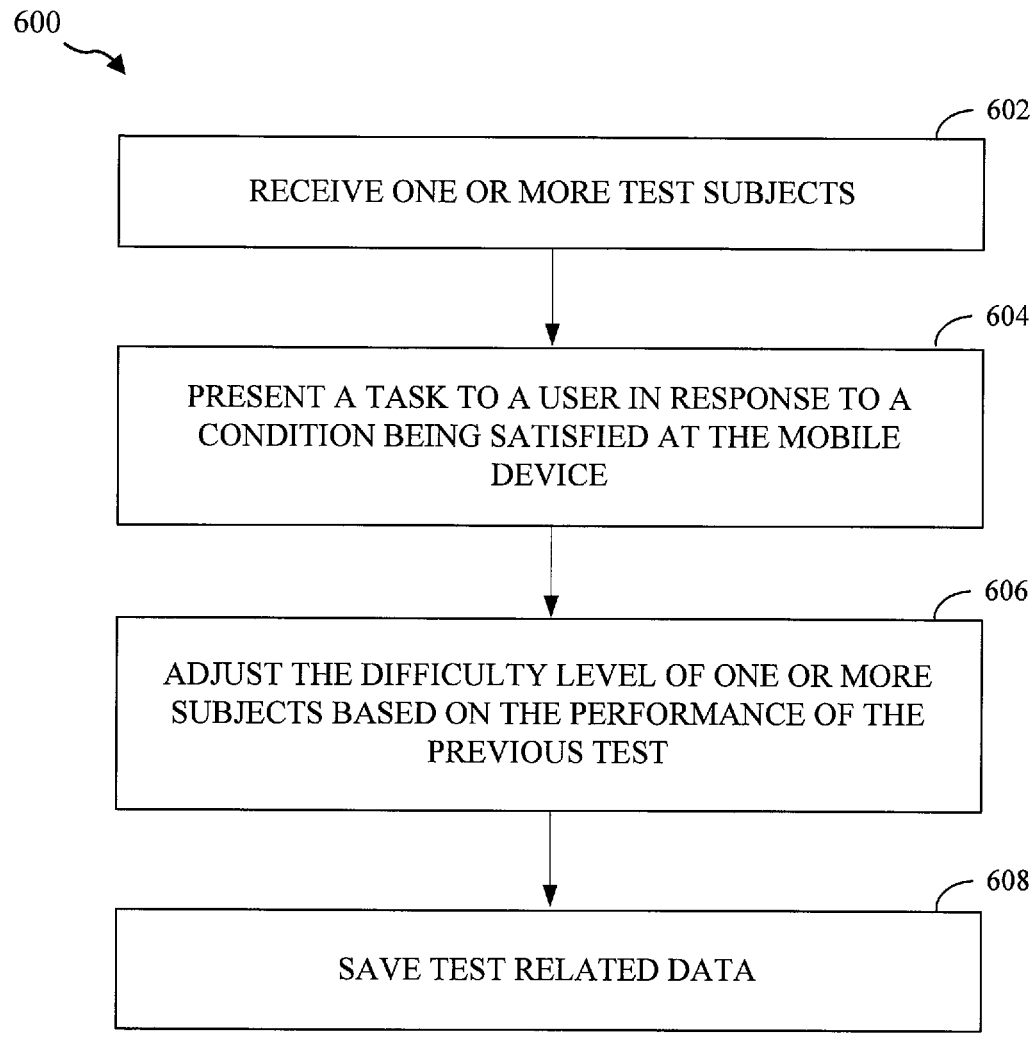
FIGS. 6, 7, and 8 are flow diagrams illustrating methods for adaptive learning according to aspects of the present disclosure

FIG. 6 is a flow diagram illustrating a method 600 for adaptive learning according to one aspect of the present disclosure. Aspects of the present disclosure are not limited to the steps of the method 600 as alternative or additional steps are possible. In the example shown in FIG. 6, the task is a test. As shown in FIG. 6, at block 602, an adaptive learning application receives one or more test subjects. The subject may be received from a cloud base database. For example, test subjects may include math, history, literature, and/or science. The test subjects may be received at a scheduled time, received on demand, and/or received in response to an event, such as a user login. The test subjects may also be pre-loaded or cached on the mobile device.

At block 604, the adaptive learning application presents a task, such as a test, to a user in response to a condition being satisfied at the mobile device. For example, the condition may be an attempt to use the mobile device. The test may include one or more of the subjects received at block 602. After successfully completing the test, the mobile device may be unlocked (not shown). After a test is completed, regardless of whether the test was successfully completed, the user's ability level and the next question difficulty level may be assessed by the application. At block 606, the adaptive learning application adjusts the difficulty level of one or more subjects based on the performance of the previous test. That is, the difficulty of some subjects may increase while the difficulty of other subjects may decrease. The difficulty level may be adjusted so that each subject remains at an adequate level of challenge for the user (e.g., test taker/task performer).

In one configuration, the difficulty level may be dynamically adjusted when it is determined that a probability threshold has been satisfied. This threshold may be applied using item response theory (IRT). IRT may also be specified to estimate the underlying ability level of test-takers and/or to establish a benchmark ability level. IRT is based on the idea that the probability of a correct answer is based on both user ability (e.g., person parameter) and question difficulty (e.g., an item parameter). The person parameter may be based on a user's underlying latent ability. The latent ability refers to a user's knowledge in a subject, such as algebra knowledge. The item parameter may be based on a combination of:

a) Difficulty: The proportion of test-takers that are able to answer this question correctly, b) Discrimination: The variation in the rate of success of individuals based on their ability level. For example, for an item with low discrimination the number of correct answers may have a similar proportion between low-performers and high-performers. In another example, for an item with high discrimination the number of correct answers for low-performers answers is less than the number of correct answers for high-performers, and c) Lower asymptote that represents guessing (e.g., 25% as the chance/guessing baseline for multiple-choice questions with four response options). That is, the item parameter assumes that a user may be guessing.

A user may be deemed to have mastered a subject when they have demonstrated over a meaningful sample size that the probability of the user answering questions of the current difficulty level is greater than or equal to a threshold. For example, the threshold may be 50% and the user may be considered a master when they have demonstrated over a meaningful sample size that the probability of answering the questions correctly is 60%.

Probability may be determined as follows: $P=1/(1+\exp(-(1-d)))$. Where, P is the probability of answering question correctly, l is the current assessed proficiency level, and d is difficulty level of question. Thus, a subject may be mastered when, over a meaningful sample size, P is greater than a threshold. In this configuration mastery of a question may be determined by the following code: (if probability>threshold) {then mastery=true}.

In comparison to conventional testing methods, IRT improves student testing by estimating the test-taker's ability on a question-by-question basis. That is, the adaptive learning application may estimate the test-taker's ability level and select the next question based on test-taker's ability level. Accordingly, the testing is improved by not presenting questions that are too easy or too hard for a test-taker. Furthermore, the testing is improved by presenting questions tailored to be within the test-taker's "challenge zone."

As discussed above, IRT may be specified to adapt questions to a user's "challenge zone." Furthermore, IRT may also be specified as a metric for the difficulty rating for each quiz question. That is, each time a question is presented, the difficulty level (e.g., item parameter) may be recalculated based on the IRT. In one configuration, when a new question is introduced into the learning system, the initial difficulty rating may be based upon a set of criteria, such as those published per grade level by the US Department of Education (DOE). The "difficulty level" refers to a question that a child in the corresponding grade should be able to master.

Each difficulty level may be divided into 10 sub levels, such as ten different sub levels, that correspond to the curriculum a child should be able to master in the time period of a specific class grade. For example, the DOE's curriculum may define that a child in first grade should be able to master a first task in the beginning of the year, master a second task in the middle of the year, and master a third task at the end of the year. Thus, if a question represents a concept that falls into the description of the first task, then the question would be assigned a difficulty level of 1.0. Additionally, a question corresponding to the second task may be assigned a difficulty level of 1.5, and a question corresponding to the third task may be assigned a difficulty level of 1.9. Based on the IRT, the difficulty level may be assessed and adjusted every time the question is presented.

At block 608, the adaptive learning application may save test related data, such as a test state, test results, and/or the test preferences. The test data may be saved locally and/or remotely. Additionally, a corresponding "level" designation may be provided for each user based on their competency and/or mastery in answering questions.

In one configuration, each user is individually assessed for each subject. For example a user may be at level 2.2 for math and level 1.5 for science. Furthermore, a user may be assessed a different level for sub-categories of a subject. For example, a user may be a level 1.3 for multiplication tables and level 1.6 for addition and subtraction within the math subject. During an initial registration period, the user or the task administrator inputs the user's school grade level to be used as a starting point (e.g., a diagnostic test) to assess the user's aptitude and corresponding grade level. The user may be initially presented with questions in each subject that match their current school grade level. The level may be adjusted based upon the user's probability of answering questions correctly in each subject. Mastery may be determined by either an average number of correctly answered questions per subject at that difficulty level or a determined learning event. A learning event refers to mastery of a subject in which the user was previously not proficient (e.g., struggling).

In one configuration, when a user answers a question correctly, the event is recorded as a correct answer and given a weight of 1 (e.g., correct). Alternatively, when the user answers the question incorrectly, then the user is presented with a hint to help the user understand the question. For example, if the question is a math question with order of operation, the hint may remind the user that the order of operation is parenthesis, exponents, multiply, divide, add, and subtract. Furthermore, when the user answers the question incorrectly, the event is recorded as an incorrect answer with a weight of 0.

Additionally, in one configuration, when the user answers the question correctly after being presented with the hint, a score of 1 is recorded in the database. Following the scoring, the adaptive learning application may randomly mix in a question of the same type at a later time. Questions of the same type refer to a question in which the subject matter is the same as the previous question. For example a question of the type math and subtype addition up to 10 such as 1+9=10 would be of the same type as 2+5=7 as both questions are within the scope of the same subtype. Additionally, in one configuration, if the user correctly answers the follow up random question, the adaptive learning application records the event as a correct answer with a weight of 2. The elevated weighting is given due to the higher probability that the user has mastered the given concept. When the user has answered a threshold of questions, such as ten or more questions, that correspond to the same subject type and has a predetermined average of correct answers, the user progresses to the next level for that subject. The user may also move down a level if the average score is less than a predetermined threshold.

Mastery of a subject may be defined in a number of ways. One aspect is described above. Additionally or alternatively, as described below, mastery may be determined based on timing or spacing of questions and/or the speed at which the questions are answered. Furthermore, mastery may be defined as a combination of all of these elements: probability, timing or spacing, and speed of question answer.

The adaptive learning application may also adjust the task difficulty level based on the user's motivational mindset. The motivational mindset may be selected by a user or a task administrator and/or assessed by the adaptive learning application based on the user's interaction with an interface of the adaptive learning application. In one configuration, the adaptive learning application may consider whether the user is more influenced by intrinsic or extrinsic motivational factors. This assessment may be used to determine the proper feedback for correct answers and/or when to progress to a new level/subject matter. For example, the adaptive learning application may provide a digital emoticon in response to a correct response in contrast to digital tokens that may be redeemed to tangible prizes, or vice versa, depending on the user's preference of learning incentives.

Figure 7:
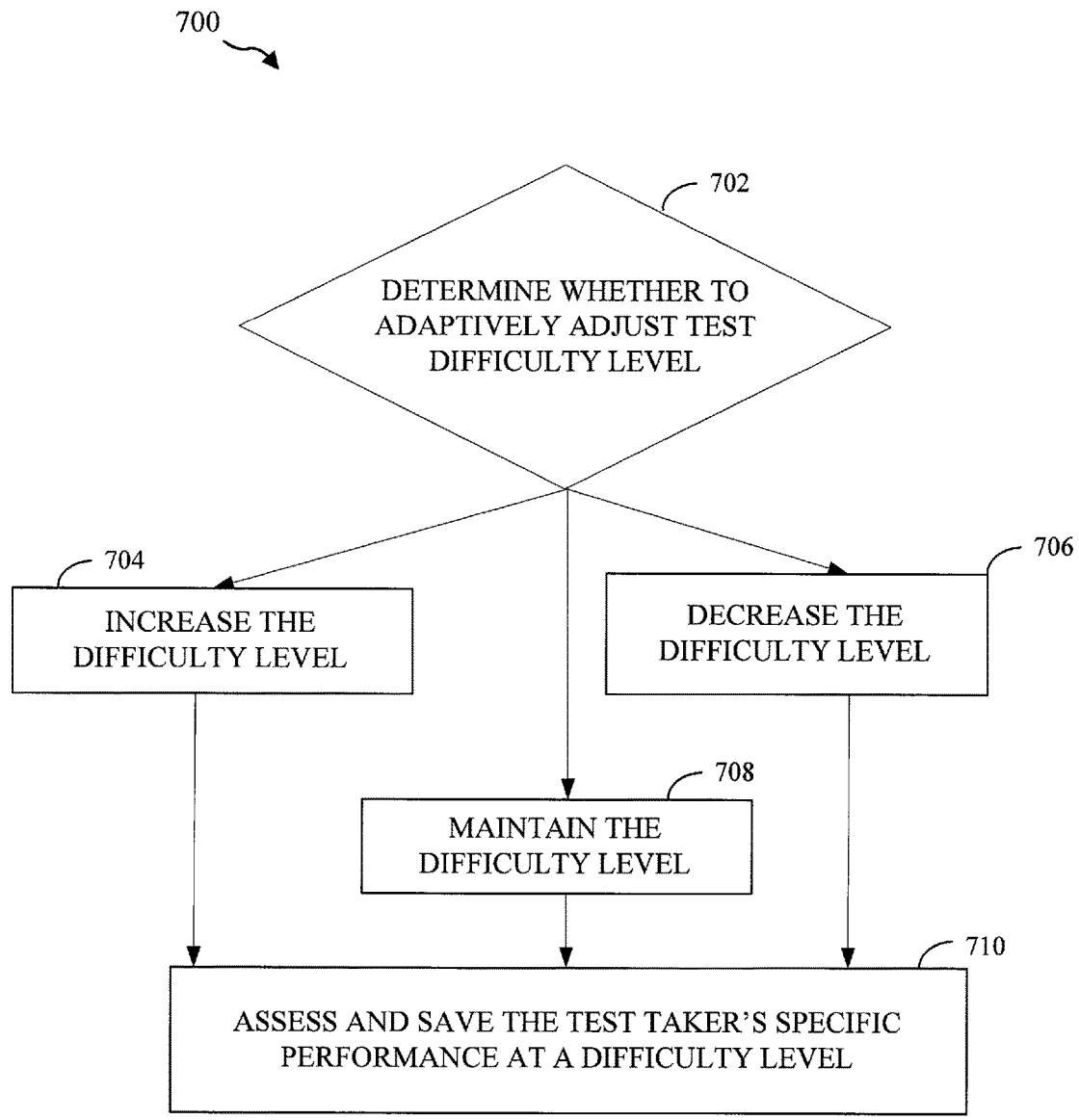

FIG. 7 is a flow diagram illustrating a method 700 for adaptively adjusting difficulty level of a task according to one aspect of the present disclosure. That is, FIG. 7 illustrates that question difficulty may be adjusted (up/down) or may remain the same based upon user performance and/or motivation. As shown in FIG. 7, at block 702, the adaptive learning application determines whether to adaptively adjust a task difficulty level. The adaptive learning application quantitatively assesses the aptitude of a user, such as a child, based on task performance. The task performance may be based on results of one or more previous tasks. The content, difficulty level, and frequency of the questions may be adjusted adaptively based on the user's performance.

Based on the determination at block 702, the adaptive learning application may increase the difficulty level at block 704, decrease the difficulty level at block 706, or keep the difficulty level same at block 708. The difficulty level may be adjusted for specific subjects or for all subjects. At block 704 and block 706, the adaptive learning application may also determine an amount of difficulty level to increase or decrease based on a number of factors. The factors may include, but are not limited to, the user's current performance, level of interest in the current test subject, the user's motivational mindset as described above, and/or other extraneous factors. The extraneous factors may include, but are not limited to, events that are not directly related to test taking itself, such as whether there is a homework assignment on the same or related subject, and/or whether there is a pending school exam on the subject.

At block 710, the adaptive learning application may assess the user's motivational mindset, skill level, and/or aptitude. For example, the adaptive learning application may determine the factors that have the greatest motivation for the user, such as intrinsic or extrinsic motivational factors. The assessment may be used to determine the proper feedback and reward/incentive for correct answers and/or for progressing to a new level. This assessment information may be sent to the task administrator's dashboard for review with the user. Furthermore, at block 710, the adaptive learning application may also learn and save the user's specific performance at a difficulty level. In one example, the adaptive learning application learns and keeps a record of how fast the user mastered the difficulty level of the subject matter and the areas of good performance and poor performance. The areas may refer to entire subjects or sub-categories of a subject. For example, math may be a subject and algebra, geometry, and calculus may be specific sub-categories of the subject.

Figure 8:
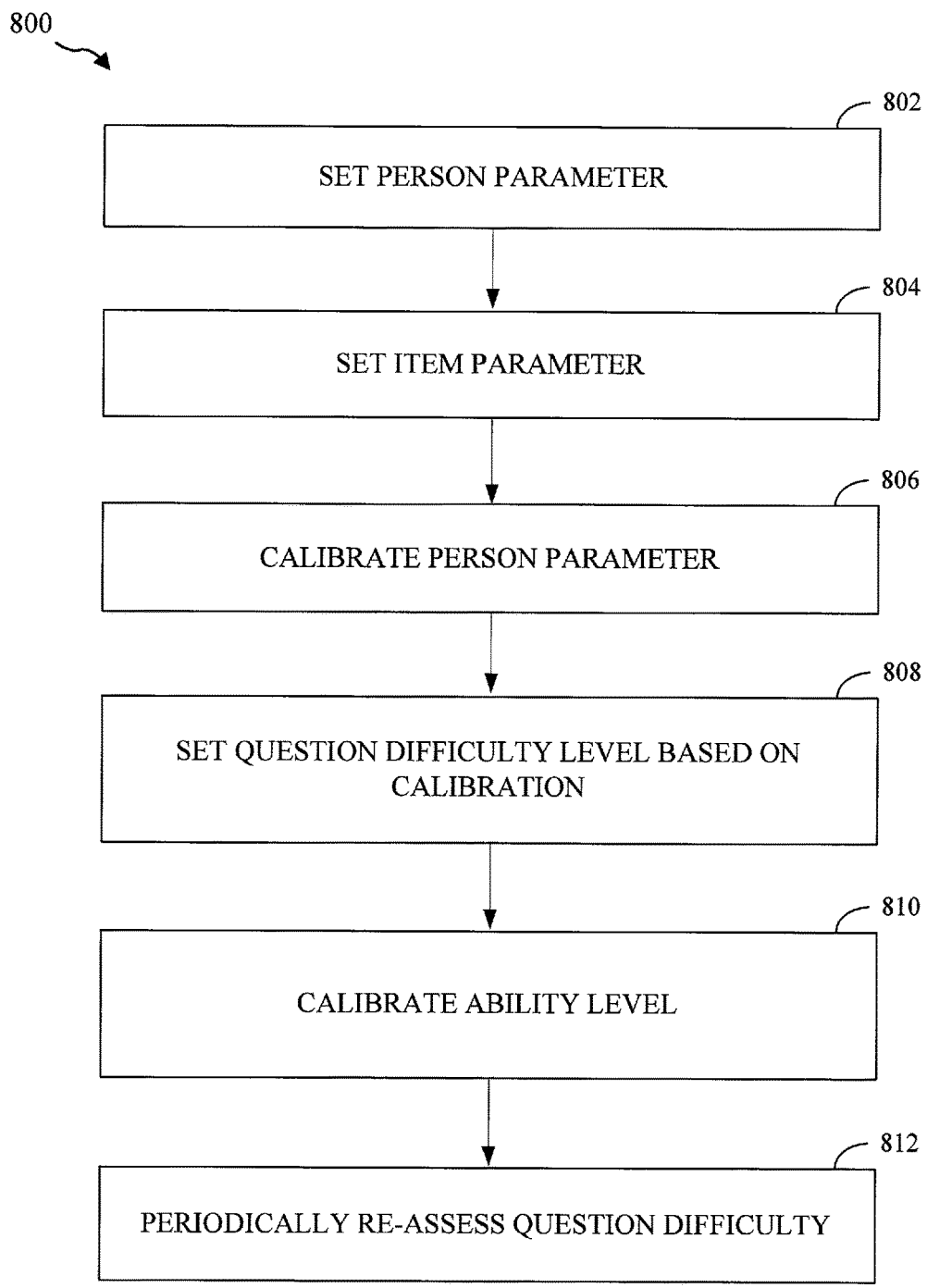

FIG. 8 illustrates a flow diagram 800 for determining a user ability level according to an aspect of the present disclosure. As shown in FIG. 8, at block 802, a person parameter is specified for a user. The person parameter may include the user's age, grade, and/or proficiency in specific subject matter. For example, the user may have a higher proficiency in math than English, thus, the math questions may be more difficult than the English questions. The proficiency may be based on a specified scale, such as a scale of 1 (low) to 10 (high). In block 804 an item parameter (e.g., question difficulty level) is set for a specific user. In one configuration, the initial person parameter and item parameter are defined based on the grade level of the user and the US DOE specifications on what a user should be to understand at that given grade level.

After setting the baseline for both the question difficulty (e.g., item parameter) and user proficiency (e.g., person parameter), a calibration process is initiated (block 806). The calibration asks the user a predetermined number of questions, such as 50 questions, which may or may not be of the same subject type (such as addition). Based on the user's score during the calibration, at block 808 the difficulty level will be set for the user.

The ability level of the user may be calibrated at 810. Data from the user's answered questions may be used to determine the accuracy of the user's ability level. For example, if a user answers a question correctly and over a meaningful sample size and greater than or equal to the threshold, they may be deemed to have mastered that subject and their level may be subsequently adjusted. This re-assessment may occur instantaneously or periodically. For example, the periodic re-assessment may occur once a month.

In addition to calibrating the user's ability level, the questions may be calibrated to maintain an accuracy of a question's assigned difficulty level, at block 812. Data from answered questions may be used to determine the accuracy of the question difficulty level. For example, if the first student answered a first question correctly and a second student answered the first question incorrectly, it may be assumed that the first student has a higher understanding of the topic then the second student. Therefore, the difficulty level of the first question should reflect the different levels of student understanding by adjusting the questions difficulty level to match the assumed aptitude level of the students. This re-assessment may periodically occur, such as once a month. Additionally, the re-assessment may occur for questions that have been answered by more than a predetermined number of students, such as ten, of varying difficulty levels.

Figure 9:
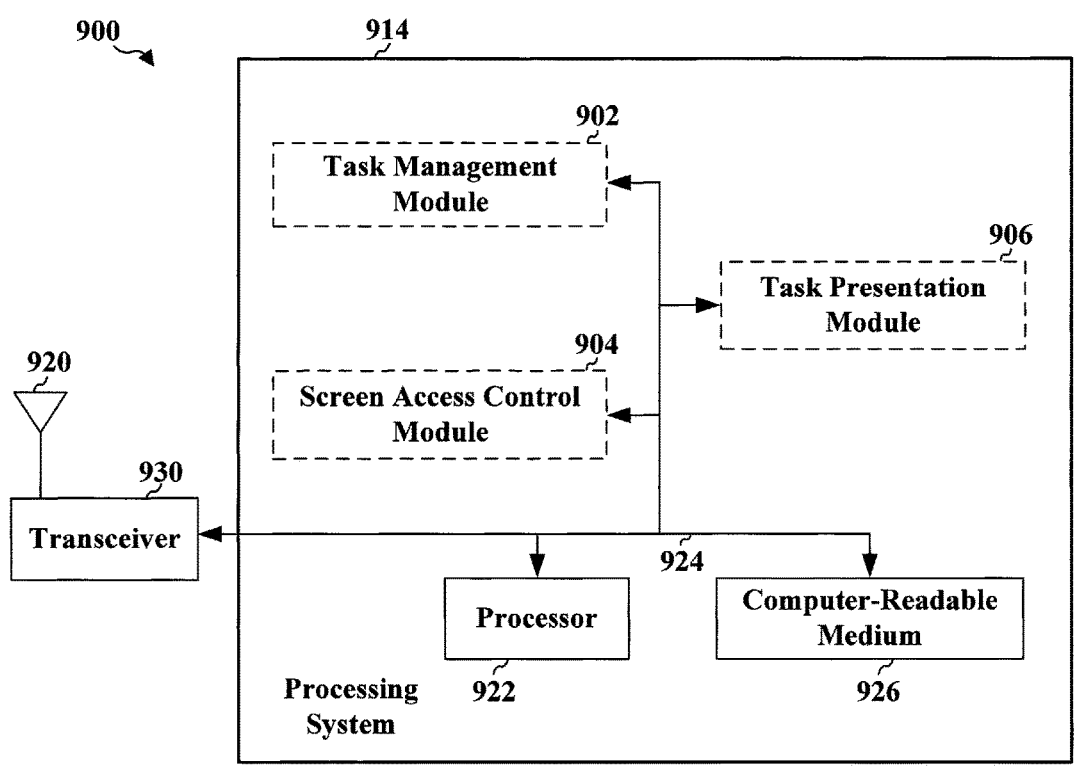
FIG. 9 is block diagram illustrating different modules/means/components for adaptive learning in an example apparatus according to one aspect of the present disclosure.

FIG. 9 is a block diagram illustrating an example of a hardware implementation for an apparatus 900 employing a processing system 914 with different modules/means/components for an adaptive learning application in an example apparatus according to one aspect of the present disclosure. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 922 the modules 902, 904, 906 and the non-transitory computer-readable medium 926. The bus 924 may also link various other circuits such as timing sources, peripherals, voltage regulators, and power management circuits, which are well known in the art, and therefore, will not be described any further.

The apparatus includes a processing system 914 coupled to a transceiver 930. The transceiver 930 is coupled to one or more antennas 920. The transceiver 930 enables communicating with various other apparatus over a transmission medium. The processing system 914 includes a processor 922 coupled to a non-transitory computer-readable medium 926. The processor 922 is responsible for general processing, including the execution of software stored on the computer-readable medium 926. The software, when executed by the processor 922, causes the processing system 914 to perform the various functions described for any particular apparatus. The computer-readable medium 926 may also be used for storing data that is manipulated by the processor 922 when executing software.

The processing system 914 includes a task interface management module 902 for managing interfaces to various external components that may include, but are not limited to the cloud databases, underlying wireless and wired networks and various mobile devices. The processing system 914 also includes a remote control module 904 for a third party such as a parent (e.g., task administrator) to remotely control various preferences, thresholds, locking/unlocking of a task screen, and/or setting/enabling/disabling various system parameters. The processing system 914 may also include an adaptive learning module 906 for implementing the adaptive learning algorithms described above and below. The modules 902, 904 and 906 may be software modules running in the processor 922, resident/stored in the computer-readable medium 926, one or more hardware modules coupled to the processor 922, or some combination thereof. The processing system 914 may be a component of a mobile device which hosts the adaptive learning application.

Figure 10:
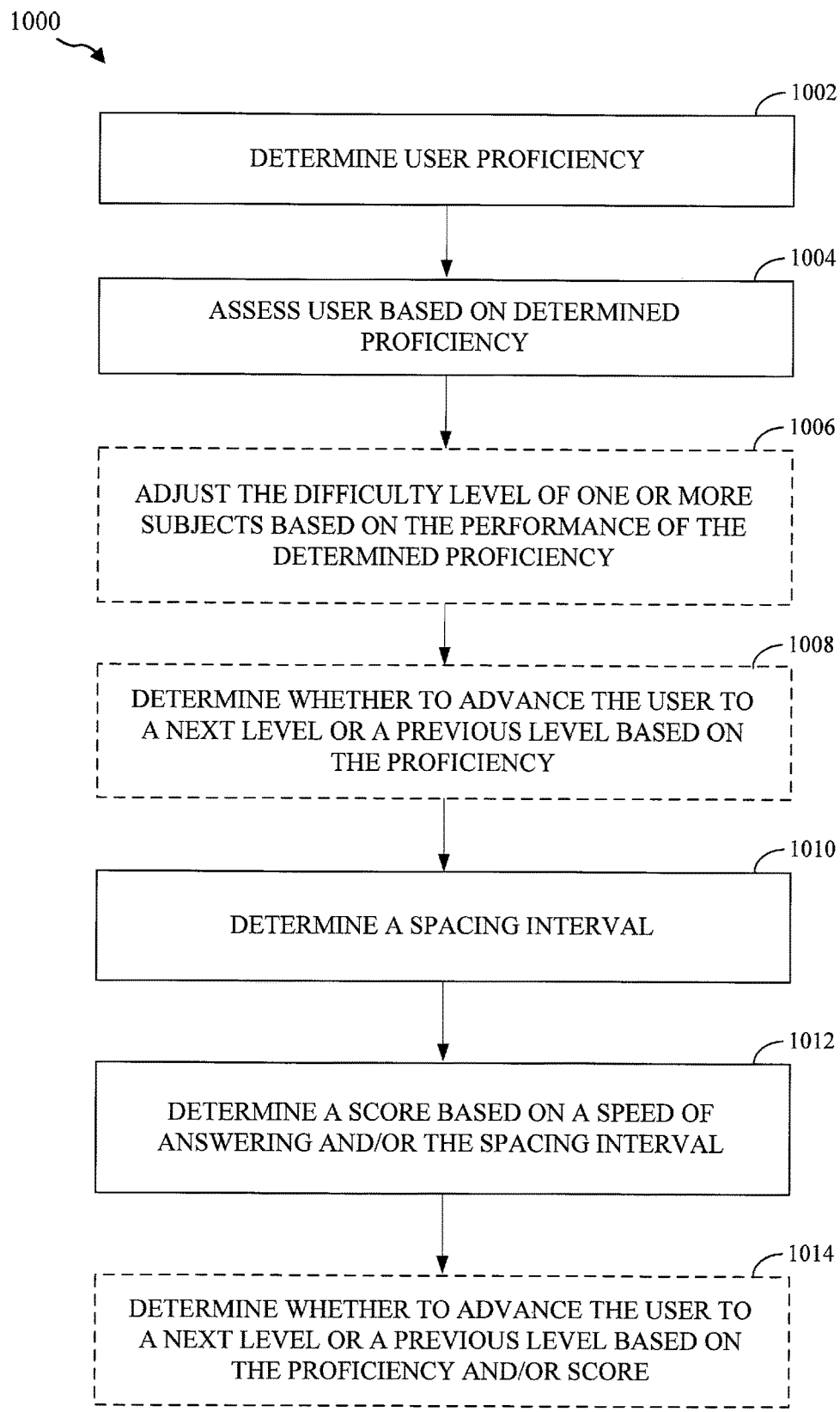
FIGS. 10, 11, and 12 are flow diagrams illustrating methods for adaptive learning according to aspects of the present disclosure.

FIG. 10 illustrates a flow diagram for a method 1000 of determining whether to adjust a user's level. The user may be moved up or down a level based on a user's mastery of a subject. Mastery may be determined based on a speed of answering a question after a long spacing event or time delay. At block 1002, a user proficiency is determined. The user proficiency may be determined by administering a test using a testing system. For example, the testing system determines a user's proficiency (e.g., level of competency) in a subject via quiz questions or the like, as discussed above in relation to FIGS. 6-8. The calibration of FIG. 10 may be performed alternate to, or in addition to, the aspects discussed in relation to FIGS. 6-8.

At block 1004, the user is assessed based on the determined user proficiency. For example, a value, level, score, grade, etc. is assessed to the user based upon their proficiency. The user proficiency may be assessed and re-assessed according to the above description relating to, for example, FIGS. 6-8. In an optional configuration, at block 1006, based on the determined proficiency (e.g., user's ability level) the difficulty level of one or more subjects may be adjusted. That is, the difficulty of some subjects may increase while the difficulty of other subjects may decrease. The difficulty level may be adjusted so that each subject remains at an adequate level of challenge for the user (e.g., test taker/task performer).

At block 1008, in an optional configuration, it is determined whether to advance the user to a next level or to a previous level based on the determined proficiency. For example, based on the proficiency and performance of the user, the testing system determines how and when the user advances up or down relative to their assigned value, level, score, grade, etc. According to aspects of the present disclosure, a question difficulty may also be determined based on the proficiency. That is, the user may remain at the same subject level and the user may also be presented with questions from a lower and/or higher subject level based on the determined proficiency.

At block 1010, a spacing interval for a same or similar question is determined based on the determined proficiency. The spacing interval may be a predetermined time period between the same or similar question. For example, if the user answers a question correctly, the spacing interval for when the user would see the same or similar question is greater than a spacing interval assigned when the user answers the question incorrectly. In one example, the increased spacing interval may be a few weeks or longer. Likewise, if the user answers a question incorrectly, the spacing interval for the same or similar question is less than the spacing interval assigned when the user answers the question correctly. In one example, the decreased spacing interval may be less than a week. The decreased spacing interval may be referred to as a low spacing interval and the increased spacing interval may be referred to as a high spacing interval.

Additionally, a speed of completing the task may also be determined based on how quickly the user completes the task. The speed may be used to determine the spacing interval and/or mastery of the subject matter. For example, if a time to answer a question is greater than a threshold, it may be inferred that the user has low (e.g., unacceptable) mastery of that topic. As such, the spacing interval may be set to a low spacing interval (e.g., less than a week) such that a similar question or a same question is asked again in a short time period. Additionally, if a time to answer a question is less than a threshold, it may be inferred that the user has mastery of that topic. As such, the spacing interval may be set to a high spacing interval such that a similar or same question is asked again in an extended time period.

In one configuration, the time for each user to answer each type of question is tracked. The time may be tracked in milliseconds or other intervals. Each individual question may be grouped into different subsets (e.g., types) or by learning objectives. The time (e.g., answer speed) for each user to answer each type of question is stored. For example, the time may be stored in the local device and/or a remote device. When a user submits an answer, the stored answer times are searched to compare an answer speed of the answer with answer speeds of other users for the same and/or similar questions. A percentile (e.g., user percentile) is calculated based on the comparison. The percentile may be defined as r (e.g., a retrieval speed percentile) where 0<r<100. For example, an r value of 1 indicates that the answer was in the slowest 1% of all answers. As another example, an r value of 99 indicates that the answer was in the quickest 1% of all answers. Other r values are possible based on how quickly the user answers the question in comparison to other users.

In one configuration, a maximum spacing interval, $d_{max}$, is determined. For example, the maximum spacing interval may be defined by an administrator as 30 days. Of course, other values for $d_{max}$ are possible.

According to an aspect, the spacing interval can be calculated as:

$$s = \frac{rd_{max}}{100},$$

where s is the spacing interval, r is the percentile, and $d_{max}$ is the maximum spacing interval. The spacing interval may be hours, days, or any other unit of time.

For example, if a time for a user to answer a question (e.g., single digit addition) is greater than a threshold, the user may be in a low percentile, such as 5% (e.g., 5 out of 100). If is set to 30 days, the system would calculate the spacing interval as:

$$s = \frac{5 \times 30}{100} = 1.5 \text{ days}.$$

Based on the determined spacing interval, the system would schedule the same or similar question to appear again in in approximately 1.5 days (e.g., 2 days). In one configuration, a fractional day may be rounded up or down.

According to another example, if a time for a user to answer a question (e.g., adding single digit numbers) is less than a threshold, the user may be in a high percentile, such as 97% (e.g., 97 out of 100). If $d_{max}$ is set to 30 days, the system would calculate the spacing interval as:

$$s = \frac{97 \times 30}{100} = 29.1 \text{ days}.$$

Based on the determined spacing interval, the system would schedule the same or similar question to appear again in approximately 29.1 days (e.g., 29 days).

In one configuration, incorrect answers are scheduled such that the same and/or similar question appear(s) one day later. In the event the user answers every question, more question types may be introduced. The new question types may be downloaded or otherwise acquired from a remote device, such as cloud server, or other network, as described herein. In the event the user is unable to answer every question in a daily study schedule, the study schedule may be pushed back to the following day or until the next quiz is taken. If a number of questions in the daily study schedule is greater than a threshold, questions may be removed from appearing after the user has achieved a predetermined mastery score in relation to each question type.

At block 1012, a score is determined based on a speed of answering a question and/or the spacing interval. The score may be an indication of mastery and/or a memory retention of the user with regards to the subject matter of the question. For example, if two users answer the same question as quickly as each other, the user who had the longer spacing interval between answering the question a second time and answering the question a first time will have the higher mastery/memory retention.

According to an aspect, a user is determined to have mastered a question or concept when the user correctly answers the question quickly (e.g., less than a answering threshold) and has not attempted the same type of question for a time that is greater than a question attempt threshold. For example, the question attempt threshold may be a week or a month. Of course, other times frames are contemplated. The thresholds (e.g., answering threshold and/or question attempt threshold) may be set and/or adjusted by the user or defined by the system.

In one configuration, a user's mastery of a question or concept may be determined by a score (e.g. user mastery score). For example, 0<m<100, where m is the user mastery score. If m is one, the user may have a poor mastery of the question or concept. If m is one hundred, the user may have a perfect mastery of the question or concept.

According to an aspect, the user mastery score is calculated as:

$$m = \frac{gr}{d_{max}},$$

where m is mastery, g is the gap (e.g, days) between when the question or question type was last asked, r is retrieval speed percentile and $d_{max}$ is the maximum spacing interval (e.g., 30 days).

For example, if a time for a user to answer a question is greater than an answer threshold, the user may be in a low percentile, such as 20% (e.g., 20 out of 100). As previously discussed, the user's percentile is determined based on a comparison of the user's question answer time to the question answer time of other users. In this example, the user may have answered the same or similar question two days ago, thus, g is two. If $d_{max}$ is 30 days, the mastery score is $$m = \frac{2 \times 20}{30} = 1.3333 (\text{e.g., } 1\%).$$

Based on the mastery score, the system may be determine that the user is not secure in the current subject matter.

According to another example, if a time for a user to answer a question is greater than an answer threshold, the user may be in a low percentile, such as 20% (e.g., 20 out of 100). If the same or similar question was answered by the user 25 days ago, g is set to 25. If $d_{max}$ is set to 30 days, the mastery score is $$m = \frac{25 \times 20}{30} = 16.6666 (\text{e.g., } 17\%).$$

Based on the mastery score, the system may determine that the user does not have mastery of the subject. Furthermore, it may be assessed that the user's learning has not been retained after a high spacing gap (e.g., 25 days).

According to another example, if a time for a user to answer a question is less than a threshold, the user may be in a high percentile, such as 80% (e.g., 80 out of 100). In this example, the same or similar question may have been answered in the past two days, therefore g is two. If $d_{max}$ is set to 30 days, the mastery score is $$m = \frac{2 \times 80}{30} = 5.3333 (\text{e.g., } 5\%).$$

In this example, the user's mastery is not secure in this topic because although the user is quick at answering this type of question, the user has not demonstrated the quick answering speed after a high spacing gap.

According to yet another example, if a time for a user to answer a question is less than a threshold, the user may be in a high percentile, such as 80% (e.g., 80 out of 100). In this example, the same or similar question may have been answered in the past twenty-five days, therefore, g is twenty-five. If $d_{max}$ is set to 30 days, the mastery score is $$m = \frac{25 \times 80}{30} = 66.6666 (\text{e.g., } 67\%).$$

Due to the length between answering the same or similar question (e.g., twenty-five days) and the user's speed of answering the question, the user is determined to show an acceptable mastery of the topic.

A threshold value for the mastery score may be set by an administrator as an acceptable level of mastery. For example, a mastery score of above 67% may be deemed acceptable. Of course, other values are possible. Additionally, different threshold values may be set for mastery scores of different subjects and/or question types.

At block 1014, in an optional configuration, it is determined whether to advance the user to a next level or to a previous level based on the determined proficiency and/or the user's score. For example, based on the proficiency and performance of the user, the testing system determines how and when the user advances up or down relative to their assigned value, level, score, grade, etc. According to aspects of the present disclosure, a question difficulty may also be determined based on the proficiency and/or score. That is, the user may remain at the same subject level and the user may also be presented with questions from a lower and/or higher subject level based on the determined proficiency and/or score.

In one configuration, the information determined and calculated herein with regards to the spacing interval and mastery may be linked to the progress "Report Card" as described above in relation to FIGS. 5-8. The information may be displayed through a graphical user interface (GUI) or other display.

Figure 11:
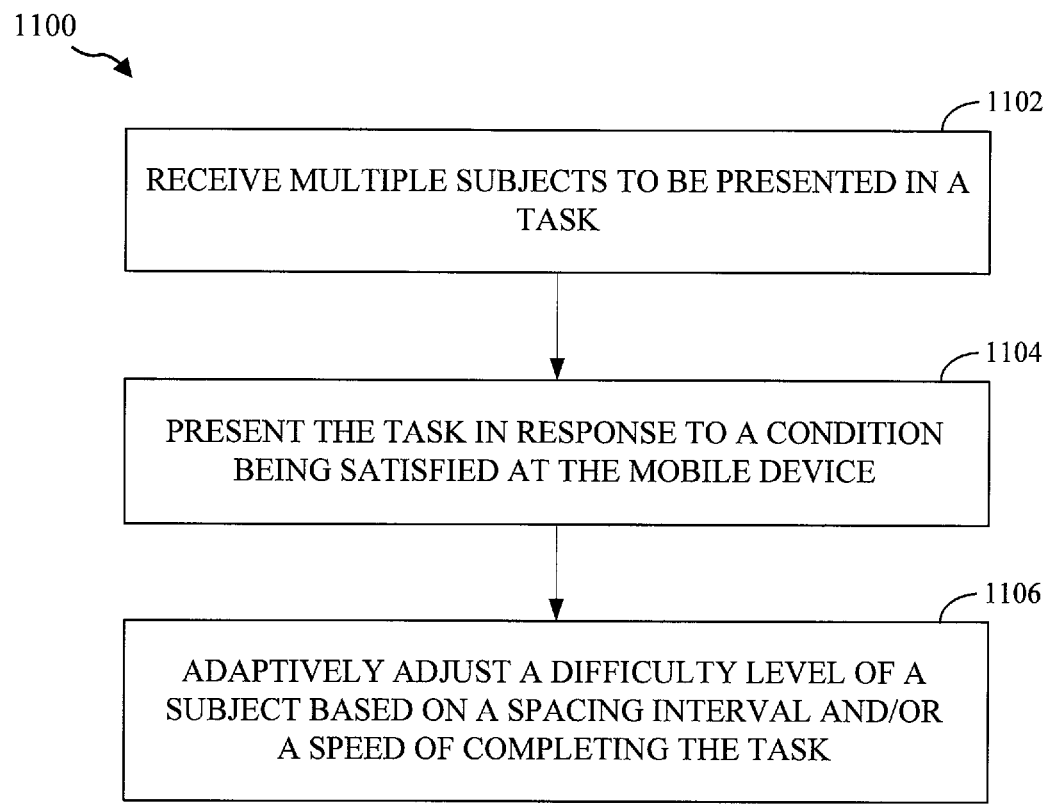

FIG. 11 illustrates a flow diagram for a method 1100 of adaptive learning according to an aspect of the present disclosure. At block 1102, the mobile device receives multiple subjects to be presented in a task. Furthermore, at block 1104, the mobile device presents the task in response to a condition being satisfied at the mobile device. At block 1106, the mobile device adaptively adjusts a difficulty level of a subject of the multiple subjects based on a spacing interval and/or a speed of completing the task.

Figure 12:
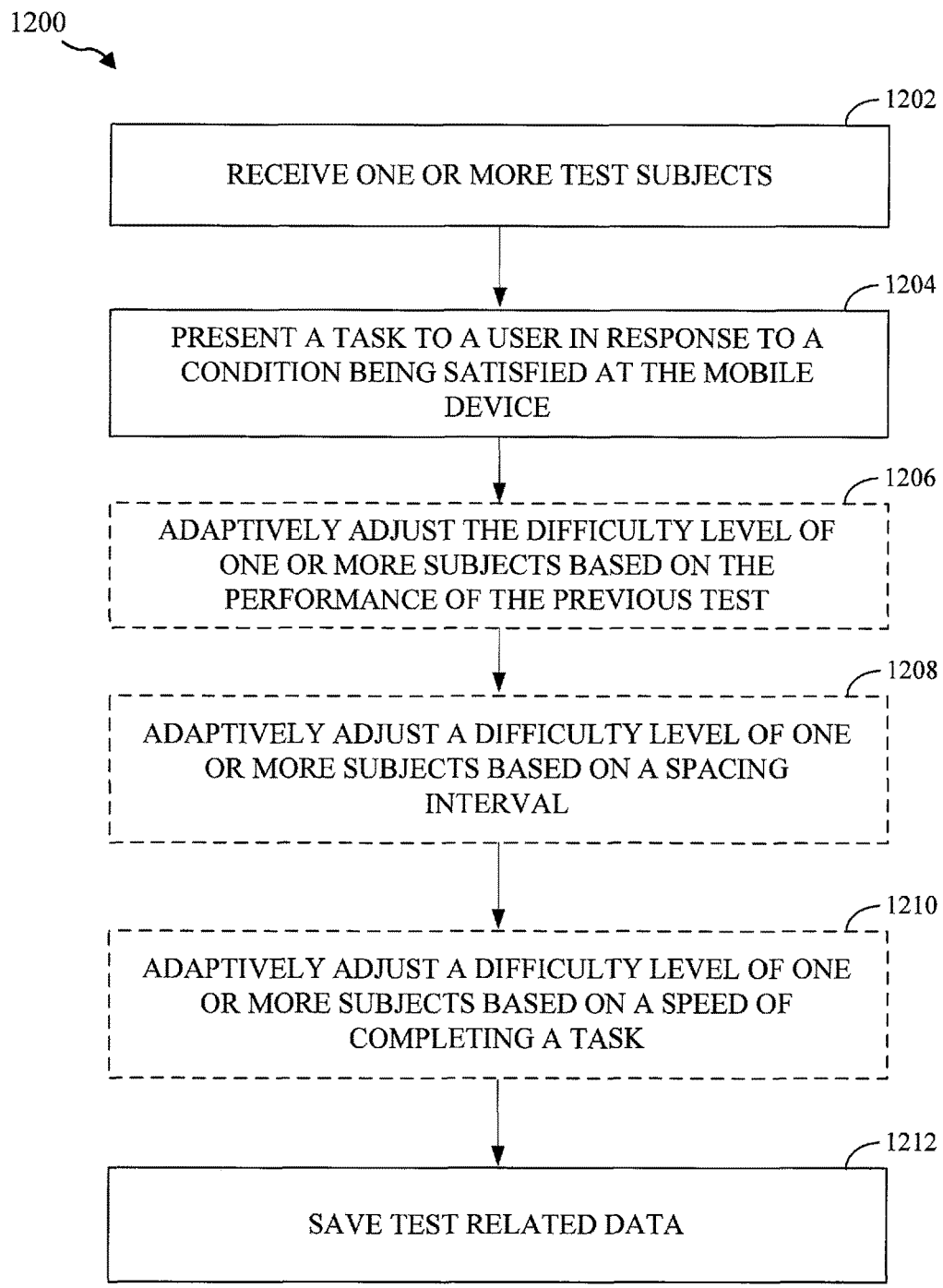

FIG. 12 illustrates a flow diagram for a method 1200 of adaptive learning according to an aspect of the present disclosure. As shown in FIG. 12, at block 1202, an adaptive learning application receives one or more test subjects. The subject may be received from a cloud base database. For example, test subjects may include math, history, literature, and/or science. The test subjects may be received at a scheduled time, received on demand, and/or received in response to an event, such as a user login. The test subjects may also be pre-loaded or cached on the mobile device.

At block 1204, the adaptive learning application presents a task, such as a test, to a user in response to a condition being satisfied at the mobile device. For example, the condition may be an attempt to use the mobile device. The test may include one or more of the subjects received at block 1202. After successfully completing the test, the mobile device may be unlocked (not shown). After a test is completed, regardless of whether the test was successfully completed, the user's ability level and the next question difficulty level may be assessed by the application.

In an optional configuration, at block 1206, the adaptive learning application adaptively adjusts the difficulty level of one or more subjects based on the performance of the previous test. That is, the difficulty of some subjects may increase while the difficulty of other subjects may decrease. The difficulty level may be adjusted so that each subject remains at an adequate level of challenge for the user (e.g., test taker/task performer).

In another optional configuration, at block 1208, the adaptive learning application adaptively adjusts a difficulty level of one or more subjects of the multiple subjects based on a spacing interval between questions that are correctly or incorrectly answered. In yet another optional configuration, at block 1210 the adaptive learning application adaptively adjusts a difficulty level of one or more subjects of the multiple subjects based on a speed of completing the task. The order of operation of blocks 1206, 1208, and 1210 is not limited to the embodiment of FIG. 12 as the difficulty level may be adjusted according to any order. Additionally, aspects of the present disclosure are contemplated for covering any combination of the aspects discussed in blocks 1206, 1208, and 1210.

In one configuration, the adaptive learning application adaptively adjusts a question difficulty while maintaining the subject difficulty level. The question difficulty may be adjusted based on the spacing interval and/or the speed of completing the task. For example, the user may be on subject level five. In this example, based on the spacing interval and/or speed of completing the task, the user may remain on subject level five and questions from subject level four (or a higher subject level) may be presented until a condition is satisfied. For example, the questions from a lower subject level may be presented until the user answers a certain number of questions correctly at a pre-determined spacing interval and/or speed.

At block 1212, the adaptive learning application may save test related data, such as a test state, test results, and/or the test preferences. The test data may be saved locally and/or remotely. Additionally, a corresponding "level" designation may be provided for each user based on their competency and/or mastery in answering questions.

Aspects of the present disclosure have described the adaptive learning application for use with a mobile device. Still, aspects of the present disclosure are not limited to implementing the adaptive learning application on a mobile device and are also contemplated for using the adaptive learning application on other types of devices, such as gaming consoles, televisions, computers, voice assistance systems (e.g., Google Home, Amazon Echo) and/or any other type of device. Furthermore, the adaptive learning application is not limited to granting access to a device and may also be used to grant access to specific applications.

The adaptive learning application may have a different deployment mode. In one example mode, the adaptive learning application may be purchased and downloaded into a mobile device as a standalone application. In an alternative deployment mode, a subscription model may allow users to subscribe to the adaptive learning application that runs on a mobile device and/or the network cloud. For a monthly fee, a subscriber may obtain accesses to the adaptive learning application and related data in the cloud. In another configuration, some aspects of the learning application may be made available for free to the user and other aspects may be made available for a fee (one time or recurring). In another configuration, some or all aspects of the learning application may be made available for free permanently or for a pre-determined amount of time.

The present invention is directed to an application, such as a proprietary application installed on a mobile device(s). The application may include a captive portal that restricts access to the said device and a corresponding cloud based management system. Aspects of the present disclosure are directed to a child as a user and a parent as a task administrator. Still, aspects of the present disclosure are not limited to the user being a child and the task administrator being a parent. Of course, aspects of the present disclosure are contemplated for any type of user that requests access to a device and any type of administrator that desires to restrict a user's access to a device. Other types of users are also contemplated, for example, user may also use aspects of the present disclosure for entertainment or continuing education. For example, the user may be an employee and the task administrator may be management. For the purpose of this disclosure, the term "parent" will refer to any individual or group of individuals which administrative access to the application and the term "child" and/or "children" refers to any individual or group of individuals whose access to the mobile device is desired to be restricted by the administrator. For the purpose of this disclosure, the terms "mastery", "learning", and "memory retention" are used interchangeably.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

It is also to be understood that the terms "user," "child," "task performer," and "test taker" may be used interchangeably wherever the contexts are appropriate. The term mobile device may include any electronic device that is portable, including, but not limited to mobile phones, laptops, iPads, tablets, game consoles, personal data assistants (PDAs), internet of things and electronic readers.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for controlling access to a device, the method comprising:
    receiving, at the device from a remote device, a plurality of interactive tasks to be presented to a device user and a condition for presenting the plurality of interactive tasks, each interactive task of the plurality of interactive tasks being associated with a difficulty level;
    determining, at the device, whether the condition is satisfied;
    restricting access to the device in response to the condition being satisfied;
    presenting, at the device, an initial interactive task from the plurality of interactive tasks in response to the condition being satisfied, the difficulty level for the initial interactive task based on a pre-determined proficiency of the device user;
    determining, at the device for each interactive task after the initial interactive task, a probability of the device user successfully performing a current interactive task of the plurality of interactive tasks based on at least one of a spacing interval between interactive tasks, a speed of completing a previous interactive task, or a combination thereof, wherein the difficulty level for the current interactive task is adjusted based on the determined probability; and
    granting, at the device, access to the device upon successful completion of a set of interactive tasks of the plurality of interactive tasks, the set of interactive tasks including the initial interactive task and at least one of the current interactive tasks.

2. The method of claim 1, further comprising:
    presenting the interactive task when access to the device is restricted.

3. The method of claim 1, in which adjusting the difficulty level comprises:
    increasing the difficulty level when the probability is equal to or greater than a threshold; and
    decreasing the difficulty level when the probability is less than the threshold.

4. The method of claim 1, further comprising providing remote access to the remote device to remotely configure settings on the device.

5. The method of claim 4, in which the settings comprises at least one of:
    a restricted access state, the difficulty level, a duration of an unrestricted period, a probability threshold, a learning category, subject matter of each exercise, a maximum number of exercises per day, a time between presenting the plurality of interactive tasks, rewards, result alerts, result saving, or a combination thereof.

6. The method of claim 1, in which the interactive task is presented as at least one of, an interactive audio dialogue session, an interactive video session, an interactive written session, an interactive gaming session, physical activity, or a combination thereof.

7. The method of claim 1, in which the spacing interval is determined based on a user percentile and a maximum spacing interval.

8. An apparatus comprising an access control system, the apparatus comprising:
    a memory; and
    at least one processor coupled to the memory, the at least one processor configured:
    to receive, at the device from a remote device, a plurality of interactive tasks to be presented to a device user and a condition for presenting the plurality of interactive tasks, each interactive task of the plurality of interactive tasks being associated with a difficulty level;
    to determine, at the device, whether the condition is satisfied;
    to restrict access to the device in response to the condition being satisfied;
    to present, at the device, an initial interactive task from the plurality of interactive tasks in response to the condition being satisfied, the difficulty level for the initial interactive task based on a pre-determined proficiency of the device user;

to determine, at the device for each interactive task after the initial interactive task, a probability of the device user successfully performing a current interactive task of the plurality of interactive tasks based on at least one of a spacing interval between interactive tasks, a speed of completing a previous interactive task, or a combination thereof, wherein the difficulty level for the current interactive task is adjusted based on the determined probability; and to grant, at the device, access to the device upon successful completion of a set of interactive tasks of the plurality of interactive tasks, the set of interactive tasks including the initial interactive task and at least one of the current interactive tasks.

9. The apparatus of claim 8, in which the at least one processor is further configured:
to present the interactive task when access to the device is restricted.

10. The apparatus of claim 8, in which the at least one processor is further configured:
to increase the difficulty level when the probability is equal to or greater than a threshold; and
to decrease the difficulty level when the probability is less than the threshold.

11. The apparatus of claim 8, in which the at least one processor is further configured to provide remote access to the remote device to remotely configure settings on the device.

12. The apparatus of claim 11, in which the settings comprises at least one of:
a restricted access state, the difficulty level, a duration of an unrestricted period, a probability threshold, a learning category, subject matter of each exercise, a maximum number of exercises per day, a time between presenting the plurality of interactive tasks, rewards, result alerts, result saving, or a combination thereof.

13. The apparatus of claim 8, in which the interactive task is presented as at least one of, an interactive audio dialogue session, an interactive video session, an interactive written session, an interactive gaming session, physical activity, or a combination thereof.

14. The apparatus of claim 8, in which the at least one processor is further configured to determine the spacing interval based on a user percentile and a maximum spacing interval.

15. A non-transitory computer-readable medium having program code recorded thereon for controlling access to a device, the program code being executed by a processor of the device and comprising:
program code to receive, at the device from a remote device, a plurality of interactive tasks to be presented to a device user and a condition for presenting the plurality of interactive tasks, each interactive task of the plurality of interactive tasks being associated with a difficulty level;
program code to determine, at the device, whether the condition is satisfied;
program code to restrict access to the device in response to the condition being satisfied;
program code to present, at the device, an initial interactive task from the plurality of interactive tasks in response to the condition being satisfied, the difficulty level for the initial interactive task based on a predetermined proficiency of the device user;
program code to determine, at the device for each interactive task after the initial interactive task, a probability of the device user successfully performing a current interactive task of the plurality of interactive tasks based on at least one of a spacing interval between interactive tasks, a speed of completing a previous interactive task, or a combination thereof, wherein the difficulty level for the current interactive task is adjusted based on the determined probability; and
program code to grant, at the device, access to the device upon successful completion of a set of interactive tasks of the plurality of interactive tasks, the set of interactive tasks including the initial interactive task and at least one of the current interactive tasks.

16. The non-transitory computer-readable medium of claim 15, in which the program code further comprises:
program code to present the interactive task when access to the device is restricted.

17. The non-transitory computer-readable medium of claim 15, in which the program code further comprises:
program code to increase the difficulty level when the probability is equal to or greater than a threshold; and
program code to decrease the difficulty level when the probability is less than the threshold.

18. The non-transitory computer-readable medium of claim 15, in which the program code further comprises program code to provide remote access to the remote device to remotely configure settings on the device.

19. The non-transitory computer-readable medium of claim 18, in which the settings comprises at least one of:
a restricted access state, the difficulty level, a duration of an unrestricted period, a probability threshold, a learning category, subject matter of each exercise, a maximum number of exercises per day, a time between presenting the plurality of interactive tasks, rewards, result alerts, result saving, or a combination thereof.

20. The non-transitory computer-readable medium of claim 15, in which the interactive task is presented as at least one of, an interactive audio dialogue session, an interactive video session, an interactive written session, an interactive gaming session, physical activity, or a combination thereof.

* * * * *